(12) United States Patent
Koizumi et al.

(10) Patent No.: US 6,371,186 B1
(45) Date of Patent: Apr. 16, 2002

(54) DEVICE FOR MANUFACTURING PANEL WITH FUNCTIONAL FILM

(75) Inventors: Hiroshi Koizumi; Hiroshi Miyamoto; Mizuki Murata; Hiroshi Okuda, all of Tokyo (JP)

(73) Assignee: Mitsubishi Denki Kabushiki Kaisha, Tokyo (JP)

(\*) Notice: Subject to any disclaimer, the term of this patent is extended or adjusted under 35 U.S.C. 154(b) by 0 days.

(21) Appl. No.: 09/319,211

(22) PCT Filed: Oct. 1, 1997

(86) PCT No.: PCT/JP97/03537

§ 371 Date: Jun. 1, 1999

§ 102(e) Date: Jun. 1, 1999

(87) PCT Pub. No.: WO99/17327

PCT Pub. Date: Apr. 8, 1999

(51) Int. Cl.⁷ .............................. B29C 63/02; H01J 9/20; B32B 1/04
(52) U.S. Cl. .................. 156/481; 156/475; 156/488
(58) Field of Search .................... 156/212, 475, 156/486, 488, 555, 582, 99, 102, 103, 312, 107, 574, 523, 477.1, 481, 580, 583.91, 295; 100/210, 211; 428/174; 425/374

(56) References Cited

U.S. PATENT DOCUMENTS 1,960,580 A * 5/1934 Fraser ........................ 156/103
4,049,485 A * 9/1977 Iverson ........................ 156/351
4,725,328 A * 2/1988 Arnold ........................ 156/295
5,653,837 A * 8/1997 Tabuki et al. ................. 156/99
5,783,021 A * 7/1998 Tabuki et al. ............... 156/295

FOREIGN PATENT DOCUMENTS

| GB | 2298816 A | 9/1996 |
|----|-----------|--------|
| JP | A7 45186 | 2/1995 |
| JP | A7 504371 | 5/1995 |
| JP | (A) 7-326289 | 12/1995 |
| JP | A8 255565 | 10/1996 |
| JP | A9 253547 | 9/1997 |

\* cited by examiner

*Primary Examiner*—Jeff H. Aftergut
*Assistant Examiner*—Barbara J. Musser

(57) ABSTRACT

A method and apparatus for affixing a functional film on a panel surface having a curvature in three dimensional directions with at least one pushing roller. A pressing roller which is elastic has a shaft inside the roller. The shaft has a varied diameter of concave curvature with the largest portions at the ends of the shaft. The inner portion of the elastic roller is separated from the shaft by a clearance which is greater in the middle of the shaft. When the roller is pressed upon a three dimensional panel, the elastic roller is deformed into the clearance area and against the shaft. This permits even pressure to be applied across the panel. In a second embodiment, a main pushing roller unit may travel along the direction while pushing the functional film against the panel surface, followed by the two follow-up displacement pushing roller units which are displayed in response to the travel of the main pushing roller unit while pushing the functional film against the panel surface.

17 Claims, 26 Drawing Sheets

FIG. 13

| TUBE TYPE | ROLLER SHAPE | AFFIXING PRESSURE | FILM SIZE LENGTH(mm)* WIDTH(mm) | CATHODE-RAY TUBE EMPTY WEIGHT | JUDGMENT |
|---|---|---|---|---|---|
| 17-INCH DISPLAY MONITOR TUBE | HOLLOW-TYPE ROLLER | 12.6kgf | 345*264 | ABOUT 13kg | 1/3 OF SOLID TYPE |
| | SOLID-TYPE ROLLER | 37.7kgf | | | NG |
| 21-INCH DISPLAY MONITOR TUBE | HOLLOW-TYPE ROLLER | 18.8kgf | 422*336 | ABOUT 19kg | 1/2 OF SOLID TYPE |
| | SOLID-TYPE ROLLER | 37.7kgf | | | NG |

FIG. 37
(a)
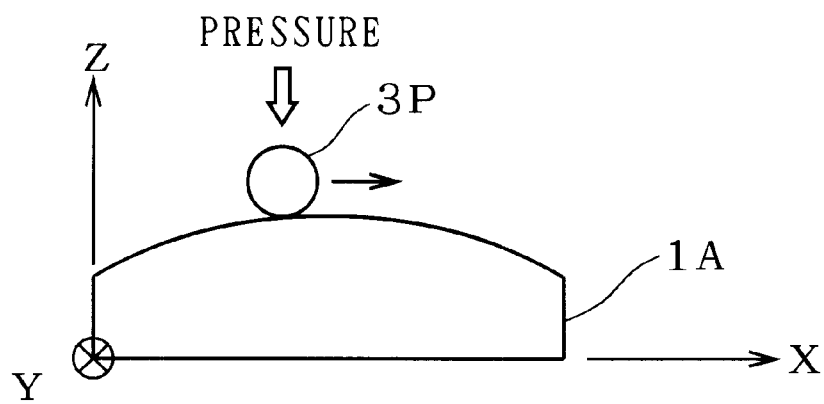
(b)
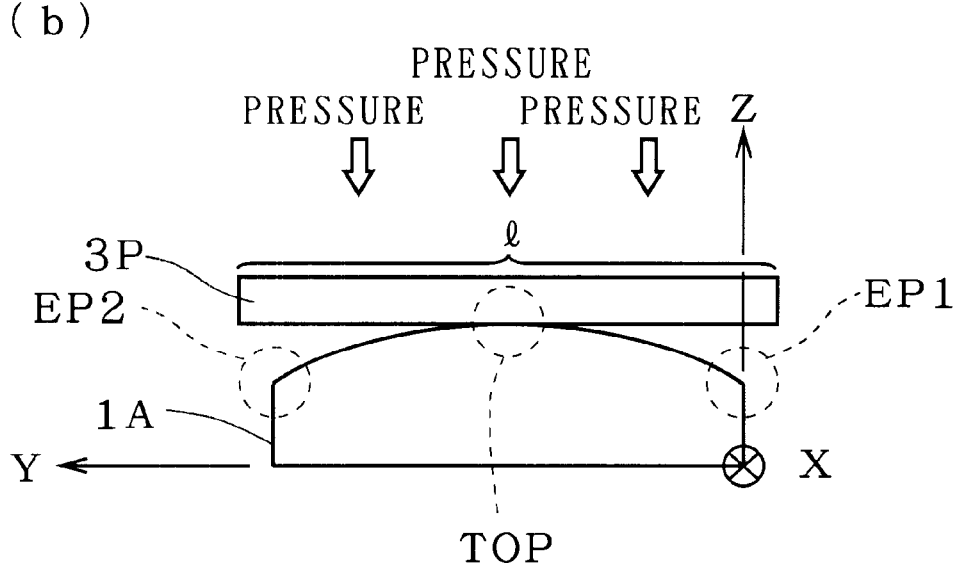

DEVICE FOR MANUFACTURING PANEL WITH FUNCTIONAL FILM

This application is the national phase under 35 U.S.C. § 371 of PCT International Application No. PCT/JP97/03537 which has an International filing date of Oct. 1, 1997, which designated the United States of America.

FIELD OF THE INVENTION

The present invention relates to a technique to uniformly affix a functional film on a panel of a cathode-ray tube and the like, whose surface has a curvature in three dimensional directions. The present invention covers the panel provided by using this technique and method and apparatus for fabricating the panel. It is natural that the present invention may be applied to a case where the functional film is affixed to a panel surface having the curvature in two dimensional directions.

THE BACKGROUND ART

There is a case where a functional film is affixed to a surface of a panel presenting an image in a fabrication process of a cathode-ray tube, for example, or other display devices. That's because the functional film has an antistatic effect, a transmittance-support effect, an antireflection effect and the like.

There are two broad methods to affix the functional film on the panel surface of the cathode-ray tube.

The first method is, as shown in FIG. 33, using an ultraviolet hardening-type resin 2D to bond a functional film 2 to a surface of a panel 1A of a cathode-ray tube 1. In this method, the ultraviolet hardening-type resin 2D is applied to the surface of the panel 1A of the cathode-ray tube 1, and then the functional film 2 is put thereon and temporally affixed by pushing pressure of a roller 3P. After temporally affixing the functional film 2, the cathode-ray tube 1 is put into an ultraviolet irradiation furnace not shown, where the ultraviolet hardening-type resin 2D is harden under ultraviolet irradiation, to bond the functional film 2 to the surface of the panel 1A.

The second method is, as shown in FIG. 34, using the functional film 2 with an adhesive 2A on its one side to bond the functional film 2 on the surface of the panel 1A of the cathode-ray tube 1 by pushing pressure of the roller 3P. In this method, a release paper 2B (see FIG. 35) covering a surface of the adhesive 2A on one side of the functional film 2 is removed before the functional film 2 is put on the surface of the panel 1A of the cathode-ray tube 1 and the roller 3P travels in a travelling direction while applying pressure to the functional film 2, to bond the functional film 2. In this case, a film with hard-coat layer 2E formed on its one side surface, such as a polyethylene terephthalate (PET) film, is used as the functional film 2 as shown in the cross section of FIG. 35.

In both the above two methods, a mechanism is provided, by which the pressure of the roller 3P can be made almost uniform along the curvature of the surface of the panel 1A in the roller travelling direction. For example, a biaxial interpolation mechanism having a curvature approximate to that relative to the roller travelling direction of the surface of the panel 1A is fixed in a roller vertical direction and a roller travelling direction, to make the roller pressure uniform in response to the vertical variation of the panel surface. When a cylinder is used to generate a pushing force of the roller, a precision regulator for controlling the pressure is attached to the roller, to make the roller pressure uniform in response to the vertical variation of the panel surface. Further, if it is needed to control the pushing pressure to keep uniform with high precision, both the above biaxial interpolation mechanism for the roller vertical direction and the roller travelling direction and the precision regulator for controlling the pressure are used.

A problem common to the above two methods arises when the panel surface has a curvature in three dimensional directions, for example, in the cathode-ray tube.

For example, if the panel surface has such a shape as shown in FIG. 36, specifically, has a predetermined curvature in the XZ plane and a rectangular section in the YZ plane (defined as "a panel surface having a curvature in two directions"), it is possible to affix the functional film on the panel surface almost completely uniformly with the pressure of the roller having the above biaxial interpolation mechanism.

However, if the panel surface has such a spherical shape as shown in Fig. (*a*) and (*b*) of 37 (defined as "a panel surface having a curvature in three directions"), specifically, has curvatures both in the XZ plane and the YZ plane, when the functional film is pushed against the panel surface with the pushing roller 3P having a length l as shown in (*b*) of FIG. 37, the highest pressure is applied at a top portion TOP of the panel surface in the Z direction, causing large variation in thickness of the roller 3P, and on the other hand the variation in thickness of the roller 3P decreases towards end portions EP1 and EP2 and the lowest pressure is applied at both the end portions.

In this case, if the roller pressure at the end portions EP1 and EP2 is increased in order to improve the method of affixing the functional film at the end portions EP1 and EP2, the pressure applied at the top portion TOP becomes so high that it causes a damage to the panel surface. Therefore, the problem can not be solved by simply increasing the roller pressure.

Thus, in the method using the background-art tubular pushing roller, even if the mechanism that controls the roller pressure to be uniform along the curvature in the roller travelling direction is provided, there is a difference in pushing pressure at both the end portion sides of the panel surface in a plane perpendicular to the roller travelling direction, and that causes a problem that the functional film can not be affixed uniformly.

For example, in the method of bonding the functional film by using the ultraviolet hardening-type resin (hereinafter, referred to as "ultraviolet hardening-type resin bonding method"), since the panel of the cathode-ray tube has a complicate curvature in three dimensional directions, there is height difference in the vertical direction (the Z direction of FIG. 37) between the top position and the bottom position by several mm at both the end portion sides of the panel surface in the plane perpendicular to the roller travelling direction, to cause a large difference in roller pressure between the end portions. As a result, the ultraviolet hardening-type resin has a difference in thickness at both the end portion sides and air bubbles are likely to remain. Therefore, it is hard to affix the functional film uniformly with high quality.

Next, also in the method of bonding the functional film by using the adhesive (hereinafter, referred to as "adhesive bonding method"), the same problem as in the ultraviolet hardening-type resin bonding method is manifested. Specifically, if the panel surface of the cathode-ray tube has a curvature in three dimensional directions, there is a large difference in roller pressure between the top portion and the end portion sides of the panel surface in the plane perpendicular to the roller travelling direction. As a result, the functional film is not sufficiently bonded and air bubbles are left in a surface to which weak pressure is applied, and that makes it extremely difficult to uniformly affix the functional film.

In this respect, as background arts intended to affix the functional film on the panel surface, there are inventions disclosed in Japanese Patent Application Laid Open Gazettes 7-326289 and 7-45186. These inventions, however, do not recognize the above problem at all nor present any means to solve the above problem. Therefore, it is impossible to adopt the techniques of these inventions.

The above problem is not confined to the panel of the cathode-ray tube, but necessarily arises in affixing the functional film on the panel surface having a curvature in three dimensional directions. For example, similar problem may arise in affixing the functional film on a panel surface of a window glass of an automobile. Therefore, suggestion on a new technique to solve the above problem and achieve fabrication of a panel with excellent functional film is strongly required.

The present invention is intended to solve the above problems and a main object of the present invention is to provide a panel in which a functional film is uniformly affixed on its surface having a curvature in three dimensional directions to take full advantage of the inherent function of the functional film, and to provide an apparatus for fabricating the panel and a method for fabricating the panel using the apparatus.

SUMMARY OF THE INVENTION

In the present invention, broad three methods as below are adopted to solve the problem.
(i) First, the present invention pays attention to always making a roller pressure uniform on a panel surface in a section cut from its front surface side by a plane perpendicular to the roller travelling direction.
(ii) Secondly, the present invention is grounded on a technical concept that the roller travels along the roller travelling direction to affix the functional film on the panel and immediately after the travel of the roller, another follow-up roller applies pressure locally to the functional film on both or either of the end portion sides of the panel surface intersecting the plane perpendicular to the roller travelling direction.
(iii) Finally, the present invention is grounded on applying the first technical concept to the second technical concept.

The above second and third technical concepts can be implemented with the following first to fifteenth aspects of the present invention. The aspects, and their actions and effects will be discussed below.

(1) According to a first aspect of the present invention, an apparatus for fabricating a panel with a functional film affixed on a surface thereof through a bonding source, comprises: a main pushing roller unit, of which a roller travelling direction is a first direction and a longitudinal direction is a second direction in a plane perpendicular to the first direction, being capable of pushing the functional film against the surface of the panel through the bonding source across the surface of the panel from a first end portion to a second end portion opposite to the first end portion both of which intersect the second direction and travelling along the roller travelling direction; and a first follow-up displacement pushing roller unit, of which a longitudinal direction is in parallel with the second direction and which is positioned on the side of the first end portion behind the main pushing roller unit relative to the roller travelling direction, being capable of pushing the functional film against the surface of the panel through the bonding source in a range of a first distance from the first end portion towards the second end portion and travelling along the roller travelling direction, wherein the first distance is smaller than a length of a side of the panel, the side of the panel connecting the first end portion to the second end portion in parallel with the second direction, and the main pushing roller unit is capable of travelling along the roller travelling direction, followed by the first follow-up displacement pushing roller unit in response to each other.

In the apparatus of the first aspect, the main pushing roller unit pushes the functional film against the panel surface within the range across the surface from the first end portion to the second end portion. In this case, when the panel surface has the curvature in three dimensional directions, as discussed above, there arises a difference in roller pressure at both of the first and second end portions of the panel surface or either (for example, the first end portion), and that causes a difference in thickness of the bonding source and the strength to bond the functional film is degraded at some portion or the functional film is not bonded at some portion.

In the apparatus, however, the functional film on the first end portion side is pushed by the main pushing roller unit and then is locally subjected to the pressure of the first follow-up displacement pushing roller unit which follows the main pushing roller unit, and that amends degradation in bonding strength of the functional film along the first end portion to make the thickness of the bonding source uniform. Moreover, an effect that the air bubbles are readily removed from the first end portion is achieved. Therefore, it becomes possible to affix the functional film uniformly with high quality on the panel surface.

For example, if a curved shape of the panel surface is problematic only on the side of the first end portion, the fabrication apparatus of the first aspect achieves the panel on which the functional film is affixed more uniformly with higher quality.

Further, if the curvature of the panel surface is problematic on both the sides of the first and second end portions, the functional film is affixed by using the apparatus of the first aspect and then further pushed by the apparatus of the first aspect travelling in a next roller travelling direction opposite to the initial roller travelling direction, to achieve the panel on which the functional film is affixed more uniformly with higher quality.

(2) According to a second aspect of the present invention, the apparatus for fabricating a panel with functional film of the first aspect further comprises: a second follow-up displacement pushing roller unit, of which a longitudinal direction is in parallel with the second direction and which is positioned on the side of the second end portion behind the main pushing roller unit relative to the roller travelling direction, being capable of pushing the functional film against the surface of the panel through the bonding source in a range of a second distance from the second end portion towards the first end portion and travelling along the roller travelling direction, wherein the second distance is smaller than the length of the side of the panel, and the main pushing roller unit is capable of travelling along the roller travelling direction, followed by the first follow-up displacement pushing roller unit and the second follow-up displacement pushing roller unit in response to one another.

In the apparatus of the second aspect, the functional film at the second end portion which is first pushed by the main pushing roller unit is subjected to the pressure of the second follow-up displacement pushing roller unit which follows the main pushing roller unit, and that amends incomplete bonding and degradation in bonding strength of the functional film which occur locally at the first and second end portions when the panel surface has the curvature in the three dimensional directions, to make the thickness of the bonding source uniform on the sides of both the end portions and remarkably reduce the air bubbles which are left. As a result, the functional film can be affixed more uniformly at the first and second end portions of the panel surface, and the inherent function of the functional film is achieved with high quality.

(3) According to a third aspect of the present invention, in the apparatus for fabricating a panel with functional film of the second aspect, the first follow-up displacement pushing roller unit comprises a first elastic roller capable of pushing the functional film directly against the surface of the panel; and a first equalizer changing an inclination of a center axis of the first elastic roller according to variation of a curvature of the surface of the panel along the roller travelling direction at the first end portion in a sectional plane defined by the second direction and a third direction perpendicular to the first and second directions, to thereby control the center axis of the first elastic roller to be in parallel with a first tangent direction in the sectional plane at the first end portion of the surface of the panel.

In the apparatus of the third aspect, the curvature of the first end portion of the panel surface in the section defined by the second and third directions varies along the first direction. At this time, the first equalizer is displaced according to variation of the above curvature to change the inclination of the center axis of the first elastic roller, thereby keeping on determining the inclination of the center axis of the first elastic roller along the roller travelling direction so that the center axis may be always in parallel with the first tangent direction. Thus, since the first follow-up displacement pushing roller unit travels and applies pressure on the side of the first end portion in the roller travelling direction while setting the inclination of the first elastic roller at the optimum value according to the curvature of the first end portion at times, it becomes possible to affix the functional film which can not be affixed by the pressure of the main pushing roller unit on the panel surface on the side of the first end portion, without air bubbles left, almost completely uniformly along the roller travelling direction.

(4) According to a fourth aspect of the present invention, in the apparatus for fabricating a panel with functional film of the third aspect, the second follow-up displacement pushing roller unit comprises a second elastic roller capable of pushing the functional film directly against the surface of the panel; and a second equalizer changing an inclination of a center axis of the second elastic roller according to variation of a curvature of the surface of the panel along the roller travelling direction at the second end portion in the sectional plane, to thereby control the center axis of the second elastic roller to be in parallel with a second tangent direction in the sectional plane at the second end portion of the surface of the panel.

In the apparatus of the fourth aspect, the second equalizer is displaced according to variation of the above curvature to change the inclination of the center axis of the second elastic roller, thereby keeping on determining the inclination of the center axis of the second elastic roller along the roller travelling direction so that the center axis may be always in parallel with the second tangent direction. Thus, since the second follow-up displacement pushing roller unit travels and applies pressure on the side of the second end portion in the roller travelling direction while setting the inclination of the second elastic roller at the optimum value according to the curvature of the second end portion at times, it becomes possible to affix the functional film which can not be affixed by the pressure of the main pushing roller unit on the panel surface on the side of the second end portion, without air bubbles left, almost completely uniformly along the roller travelling direction.

(5) According to a fifth aspect of the present invention, in the apparatus for fabricating a panel with functional film of the fourth aspect, the main pushing roller unit comprises a main elastic roller capable of pushing the functional film directly against the surface of the panel; and a main pressure control mechanism capable of controlling a main pressure independently, the first follow-up displacement pushing roller unit further comprises a first pressure control mechanism capable of controlling a first follow-up displacement pressure independently, and the second follow-up displacement pushing roller unit further comprises a second pressure control mechanism capable of controlling a second follow-up displacement pressure independently.

In the apparatus of the fifth aspect, since the pressure control mechanisms capable of controlling the pressures independently are provided for the respective rollers, it is possible to make the pressure almost uniformly against the functional film on the whole surface of the panel and moreover take advantage of the functions of the first and second equalizers in more optimum manner, and as a result, the panel can be provided, on which the functional film is affixed extremely uniformly with so high quality as takes full advantage of its inherent function.

(6) According to a sixth aspect of the present invention, in the apparatus for fabricating a panel with functional film of the fifth aspect, the main elastic roller comprises a center hole therethrough, the main pushing roller unit further comprises a shaft inserted into the center hole; an elastic roller holding part supporting both end portions of the shaft extending off the center hole; and a main pushing part connected to the main elastic roller holding part and the main pressure control mechanism, said main pushing part propagating the main pressure controlled by the main pressure control mechanism to the main elastic roller holding part, and wherein a clearance is provided between an outer surface of a portion of inserted part of the shaft in the center hole and a wall surface of the center hole.

There is a difference in height between the top portion and the first and second end portions (bottom portions) of the panel surface in the sectional plane defined by the second and third directions, perpendicular to the roller travelling direction. Therefore, the background art has a problem that there arises a difference in pressure between the top portion and the bottom portions and disadvantageously the pressures on the bottom portion sides anyway becomes lower.

In the apparatus of the sixth aspect, however, since the clearance is provided inside the main elastic roller, the pushing portion of the main elastic roller is displaced towards the hollow portion side of the clearance when the main elastic roller pushes the functional film against the panel surface. The displacement at the top portion is the maximum and that at the bottom portion side is the minimum. As a result, the thickness of the pushing portion of the main elastic roller becomes almost uniform in the plane defined by the second and third directions, the pressure of the main elastic roller is made uniform in the plane and the functional film can be affixed on the panel surface much more uniformly. At this time, few air bubbles are left and the functional film with high quality is achieved.

(7) According to a seventh aspect of the present invention, in the apparatus for fabricating a panel with functional film of the sixth aspect, the first elastic roller comprises a first center hole therethrough, the first follow-up displacement pushing roller unit further comprises a first shaft inserted into the first center hole; a first elastic roller holding part comprising the first equalizer, the first elastic roller holding part supporting both end portions of the first shaft extending off the first center hole; and a first pushing part connected to the first equalizer of the first elastic roller holding part and the first pressure control mechanism, the first pushing part propagating the first follow-up displacement pressure controlled by the first pressure control mechanism to the first elastic roller holding part, a first clearance is provided between an outer surface of a portion of inserted part of the first shaft in the first center hole and a wall surface of the first center hole, the second elastic roller comprises a second center hole therethrough, the second follow-up displacement pushing roller unit further comprises a second shaft inserted into the second center hole; a second elastic roller holding part comprising the second equalizer, the second elastic roller holding part supporting both end portions of the second shaft extending off the second center hole; and a second pushing part connected to the second equalizer of the second elastic roller holding part and the second pressure control mechanism, the second pushing part propagating the second follow-up displacement pressure controlled by the second pressure control mechanism to the second elastic roller holding part, and a second clearance is provided between an outer surface of a portion of inserted part of the second shaft in the second center hole and a wall surface of the second center hole.

In the apparatus of the seventh aspect, the pushing portion of the first elastic roller is displaced towards the hollow portion side of the above clearance when the first elastic roller pushes the functional film against the panel surface. The displacement at the top portion is the maximum and that at the bottom portion side is the minimum. As a result, the thickness of the pushing portion of the first elastic roller becomes almost uniform in the plane defined by the second and third directions, the pressure of the first elastic roller is made uniform in the plane and the functional film can be affixed on the panel surface much more uniformly.

Moreover, in the apparatus of the seventh aspect, the pushing portion of the second elastic roller is displaced towards the hollow portion side of the clearance when the second elastic roller pushes the functional film against the panel surface. The displacement at the top portion is the maximum and that at the bottom portion side is the minimum. As a result, the thickness of the pushing portion of the second elastic roller also becomes almost uniform in the plane defined by the second and third directions, the pressure of the second elastic roller is made uniform in the plane and the functional film can be affixed on the panel surface much more uniformly.

It is thereby possible to provide the panel having the functional film which is affixed almost completely uniformly on the whole panel surface and can fully perform its inherent function.

(8) According to an eighth aspect of the present invention, a method for fabricating the panel with the functional film through the bonding source by using the apparatus of the first aspect, comprises: a first step of disposing the panel, the functional film with its affixing surface facing the surface of the panel, the main pushing roller unit and the first follow-up displacement pushing roller unit positioned on the side of the first end portion behind the main pushing roller unit relative to the roller travelling direction at their predetermined positions; and a second step of controlling travel of the main pushing roller unit and the first follow-up displacement pushing roller unit in the roller travelling direction so that the main pushing roller unit travels, followed by the first follow-up displacement pushing roller unit, and both the main pushing roller unit and the first follow-up displacement pushing roller unit push the functional film against the surface of the panel through the bonding source, to affix the functional film on the surface of the panel with respective pressures of the main pushing roller unit and the first follow-up displacement pushing roller unit.

The eighth aspect of the present invention produces the same effect as the first aspect.

(9) According to a ninth aspect of the present invention, in the method for fabricating a panel with functional film of the eighth aspect, the first step comprises the step of further disposing the second follow-up displacement pushing roller unit, of which a longitudinal direction is in parallel with the second direction and which is positioned on the side of the second end portion behind the main pushing roller unit relative to the roller travelling direction, being capable of travelling along the roller travelling direction while pushing the functional film against the surface of the panel through the bonding source in a range of the second distance from the second end portion towards the first end portion in the second direction, and the second step corresponds to the step of controlling travel of the main pushing roller unit, the first follow-up displacement pushing roller unit and the second follow-up displacement pushing roller unit in the roller travelling direction so that the main pushing roller unit travels, followed by both the first follow-up displacement pushing roller unit and the second follow-up displacement pushing roller unit, and all of the main pushing roller unit, the first follow-up displacement pushing roller unit and the second follow-up displacement pushing roller unit push the functional film against the surface of the panel through the bonding source, to affix the functional film on the surface of the panel with respective pressures of the main pushing roller unit, the first follow-up displacement pushing roller unit and the second follow-up displacement pushing roller unit.

The ninth aspect of the present invention produces the same effect as the second aspect.

(10) According to a tenth aspect of the present invention, in the method for fabricating a panel with functional film of the ninth aspect, the first follow-up displacement pushing roller unit comprises a first elastic roller capable of pushing the functional film directly against the surface of the panel; and a first equalizer changing an inclination of a center axis of the first elastic roller according to variation of a curvature of the surface of the panel along the roller travelling direction at the first end portion in a sectional plane defined by the second direction and a third direction perpendicular to the first and second directions, to thereby control the center axis of the first elastic roller to be in parallel with a first tangent direction in the sectional plane at the first end portion of the surface of the panel, and the second follow-up displacement pushing roller unit comprises a second elastic roller capable of pushing the functional film directly against the surface of the panel; and a second equalizer changing an inclination of a center axis of the second elastic roller according to variation of a curvature of the surface of the panel along the roller travelling direction at the second end portion in the sectional plane, to thereby control the center axis of the second elastic roller to be in parallel with a second tangent direction in the sectional plane at the second end portion of the surface of the panel.

The tenth aspect of the present invention produces the same effect as the fourth aspect.

(11) According to an eleventh aspect of the present invention, in the method for fabricating a panel with functional film of the tenth aspect, the travel of the main pushing roller unit, the first follow-up displacement pushing roller unit and the second follow-up displacement pushing roller unit along the roller travelling direction is controlled while the respective pressures of the main pushing roller unit, the first follow-up displacement pushing roller unit and the second follow-up displacement pushing roller unit are controlled independently.

The eleventh aspect of the present invention produces the same effect as the fifth aspect.

(12) According to a twelfth aspect of the present invention, in the method for fabricating a panel with functional film of the eleventh aspect, the main pushing roller unit comprises a main elastic roller comprising a center hole therethrough; a shaft inserted into the center hole; an elastic roller holding part supporting both end portions of the shaft extending off the center hole; and a main pushing part connected to the main elastic roller holding part, the main pushing part propagating the pressure for the main pushing roller unit which is controlled to the main elastic roller holding part, a clearance is provided between an outer surface of a portion of inserted part of the shaft in the center hole and a wall surface of the center hole, the first follow-up displacement pushing roller unit comprises a first elastic roller comprising a first center hole therethrough; a first shaft inserted into the first center hole; a first elastic roller holding part comprising the first equalizer, the first elastic roller holding part supporting both end portions of the first shaft extending off the first center hole; and a first pushing part connected to the first equalizer of the first elastic roller holding part, propagating the pressure for the first follow-up displacement pushing roller unit which is controlled to the first elastic roller holding part, a first clearance is provided between an outer surface of a portion of inserted part of the first shaft in the first center hole and a wall surface of the first center hole, the second follow-up displacement pushing roller unit comprises the second elastic roller comprising a second center hole therethrough; a second shaft inserted into the second center hole; a second elastic roller holding part comprising the second equalizer, and supporting both end portions of the second shaft extending off the second center hole; and a second pushing part connected to the second equalizer of the second elastic roller holding part, propagating the pressure for the second follow-up displacement pushing roller unit which is controlled to the second elastic roller holding part, and a second clearance is provided between an outer surface of a portion of inserted part of the second shaft in the second center hole and a wall surface of the second center hole.

The twelfth aspect of the present invention produces the same effect as the seventh aspect.

(13) According to a thirteenth aspect of the present invention, a panel comprises: the surface on which the functional film is affixed by the method of the ninth aspect.

In the method of the thirteenth aspect, it is possible to provide the panel having the functional film which is affixed in an improved manner on the sides of the first and second end portions of the panel surface.

(14) According to a fourteenth aspect of the present invention, in the panel of the thirteenth aspect, the first follow-up displacement pushing roller unit comprises a first elastic roller capable of pushing the functional film directly against the surface of the panel; and a first equalizer changing an inclination of a center axis of the first elastic roller according to variation of a curvature of the surface of the panel along the roller travelling direction at the first end portion in a sectional plane defined by the second direction and a third direction perpendicular to the first and second directions, to thereby control the center axis of the first elastic roller to be in parallel with a first tangent direction in the sectional plane at the first end portion of the surface of the panel, and the second follow-up displacement pushing roller unit comprises a second elastic roller capable of pushing the functional film directly against the surface of the panel; and a second equalizer changing an inclination of a center axis of the second elastic roller according to variation of a curvature of the surface of the panel along the roller travelling direction at the second end portion in the sectional plane, to thereby control the center axis of the second elastic roller to be in parallel with a second tangent direction in the sectional plane at the second end portion of the surface of the panel, wherein the first follow-up displacement pushing roller unit comprising the first equalizer and the second follow-up displacement pushing roller unit comprising the second equalizer are moved in the roller travelling direction in response to the main pushing roller unit to affix the functional film on the surface.

In the method of the fourteenth aspect, it is possible to provide the panel in which the degradation in bonding strength of the functional film along the roller travelling direction at the end portions of the panel surface is remarkably amended.

(15) According to a fifteenth aspect of the present invention, in the panel of the fourteenth aspect, the travel of the main pushing roller unit, the first follow-up displacement pushing roller unit and the second follow-up displacement pushing roller unit along the roller travelling direction is controlled while the respective pressures of the main pushing roller unit, the first follow-up displacement pushing roller unit and the second follow-up displacement pushing roller unit are controlled independently, whereby the functional film is affixed on the surface.

In the method of the fifteenth aspect, it is possible to provide the panel having the functional film which is affixed extremely uniformly with high quality on the whole panel surface having the curvature in three dimensional directions.

The above first problem-solving method can be achieved by the sixteenth to twentieth aspects below. Constitutions, actions and effects in these aspects will be discussed below.

(16) According to a sixteenth aspect of the present invention, an apparatus for fabricating a panel with a functional film affixed on a surface thereof through a bonding source, comprises: a main pushing roller unit, of which a roller travelling direction is a first direction and a longitudinal direction is a second direction in a plane perpendicular to the first direction, being capable of pushing the functional film against the surface of the panel through the bonding source across the surface of the panel from a first end portion to a second end portion opposite to the first end portion both of which intersect the second direction and travelling along the roller travelling direction, wherein the main pushing roller unit comprises a main elastic roller comprising a center hole therethrough; a shaft inserted into the center hole; a main pushing part supporting both end portions of the shaft extending off the center hole; and a pushing part connected to the main elastic roller holding part, propagating a pressure for the main pushing roller unit to the main elastic roller holding part, and a clearance is provided at least between a wall surface of the center hole of the elastic roller on a side where the surface of the panel is pushed and an outer surface on the side where the surface of the panel is pushed of a portion of inserted part of the shaft in the center hole.

In the apparatus of the sixteenth aspect, the pushing surface of the elastic roller is displaced towards the side of the clearance according to the curvature of the panel surface in the plane perpendicular to the roller travelling direction. At this time, the displacement at the top portion is the maximum. Therefore, since the thickness and pressure of the elastic roller are made uniform on the whole surface of the panel in the plane, it is possible to improve the bonding state of the functional film at both the end portions.

(17) According to a seventeenth aspect of the present invention, in the apparatus for fabricating a panel with functional film of the sixteenth aspect, the inserted part of the shaft comprises a first portion having a first outer diameter corresponding to an inner diameter of the elastic roller; a second portion having a second outer diameter corresponding to the inner diameter of the elastic roller; and a third portion connected to the first and second portions and having an outer shape in which an outer diameter of any position is smaller than the inner diameter of the elastic roller.

The apparatus of the seventeenth aspect produces the effect of easily achieving the clearance by mechanical processing of the outer shape of the shaft.

(18) According to an eighteenth aspect of the present invention, in the apparatus for fabricating a panel with functional film of the seventeenth aspect, the outer shape of the third portion comprises a shape determined on the basis of a curvature of the surface of the panel in a sectional plane defined by the second direction and a third direction perpendicular to the first and second directions.

In the apparatus of the eighteenth aspect, since the pushing surface of the elastic roller can be deformed according to the curvature of the panel surface in the plane perpendicular to the roller travelling direction and the thickness of the elastic roller during pushing can be made almost even, it is possible to affix the functional film more uniformly.

(19) According to a nineteenth aspect of the present invention, in a method for fabricating a panel with functional film, the functional film is affixed on the surface of the panel through the bonding source by using the apparatus of the sixteenth aspect.

In the method of the nineteenth aspect, it is possible to affix the functional film by uniformly pushing against the whole panel surface in the plane perpendicular to the roller travelling direction.

(20) According to a twentieth aspect of the present invention, a panel comprises the surface on which the functional film is affixed by using the apparatus of the sixteenth aspect.

The panel of the twentieth aspect can have the functional film which is affixed uniformly with high quality on its whole surface.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a view showing comparison data of the first preferred embodiment of the present invention and the background art;

FIG. 37 is a view illustrating a problem of a panel surface having a curvature in three dimensional directions.

DESCRIPTION OF THE PREFERRED EMBODIMENTS

1. The First Preferred Embodiment

In the first preferred embodiment, a panel surface of a cathode-ray tube is adopted as a panel surface having a curvature in three dimensional directions.

Figure 1:
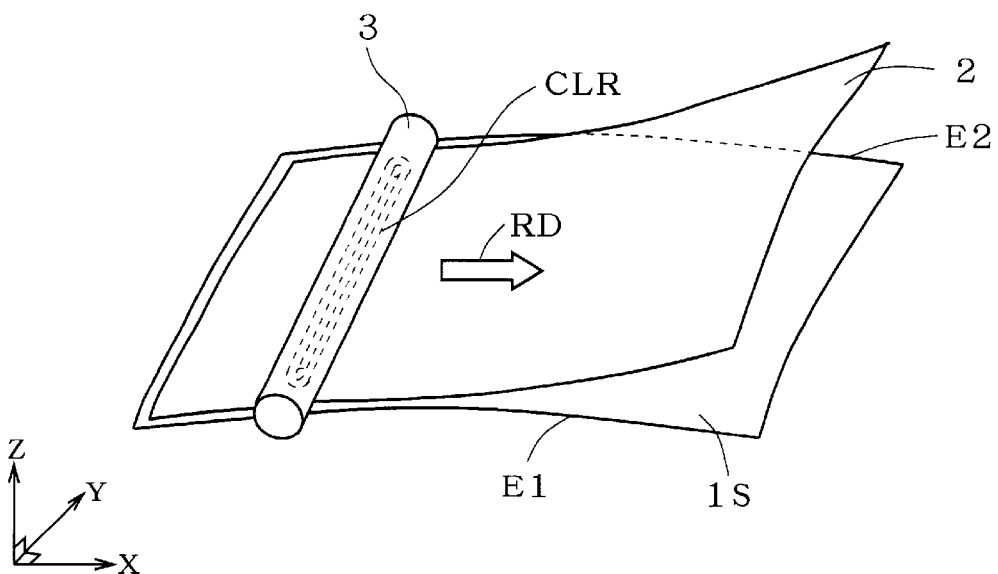
FIG. 1 is a view illustrating the basic concept of a first preferred embodiment of the present invention.

The technical concept of the first preferred embodiment is schematically shown in FIG. 1. Specifically, the first preferred embodiment is intended to provide a new constitution of a pushing roller unit 3 having an elastic roller which can be easily deformed along the curvature of the panel surface in the YZ plane perpendicular to the roller travelling direction RD(X) of the pushing roller unit 3 so that the roller pressure may be made uniform in the YZ plane in affixing the functional film 2 on the panel surface 1S of the cathode-ray tube by using the pushing roller unit 3, as shown in FIG. 1.

A roller part of the pushing roller unit 3 consists of a roller made of tubular elastic rubber having a center hole and a center axis (shaft) inserted in the center hole. There is a clearance CLR, being hollow, between part of the inserted portion of the shaft and the center hole. The clearance CLR can be achieved by the following constitutions. Specifically, an outer configuration of the shaft is ① a configuration with concave curvature approximate to the curvature of the panel surface 1S in the YZ plane perpendicular to the roller travelling direction RD or ② a configuration with at least one concave step for artificial curvature. In this case, the curvature of the shaft with curvature, the number of steps, the amount of level difference and the level pitch of the stepped shaft depend on the curvature of the panel surface 1S of the cathode-ray tube in the YZ plane.

The pushing roller mechanism of FIG. 1 can be naturally used for both the ultraviolet hardening-type resin bonding method and the adhesive bonding method, and hereafter the latter case will be discussed, for explanatory convenience.

Further, theoretically, it is only needed that the clearance CLR may be provided between at least inner diameter (that is, a wall surface of the center hole) of the elastic roller on the side of pushing the panel surface 1S and an outline (outer surface) of the pushing surface side of the elastic roller in part of the inserted portion of the shaft.

Now, a panel fabrication apparatus having a pushing roller unit for affixing a functional film of the first preferred embodiment will be discussed below in detail with reference to figures.

Figure 2:
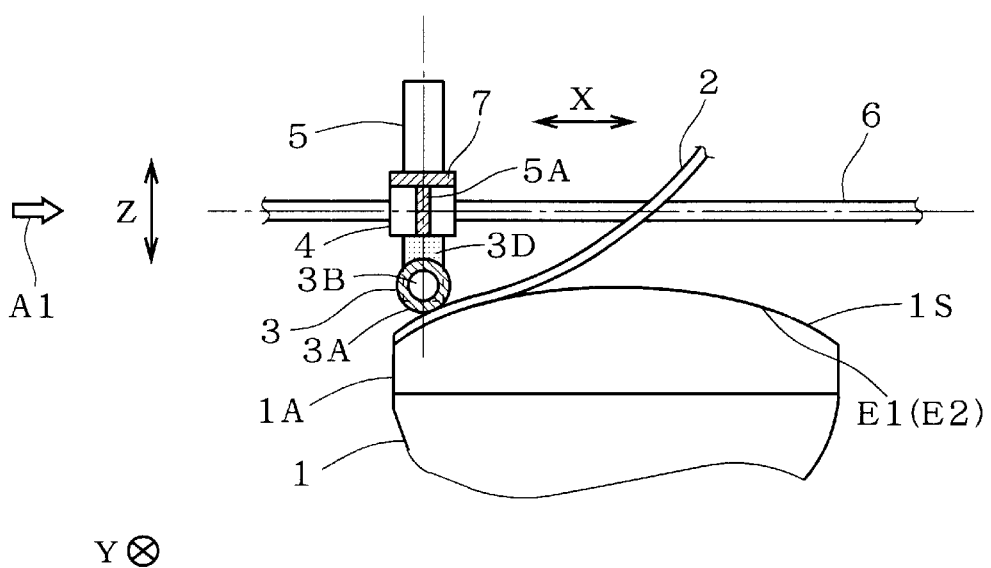
FIG. 2 is a view showing a constitution of a portion where a functional film is affixed in a panel fabrication apparatus in accordance with the first preferred embodiment of the present invention.
Figure 3:
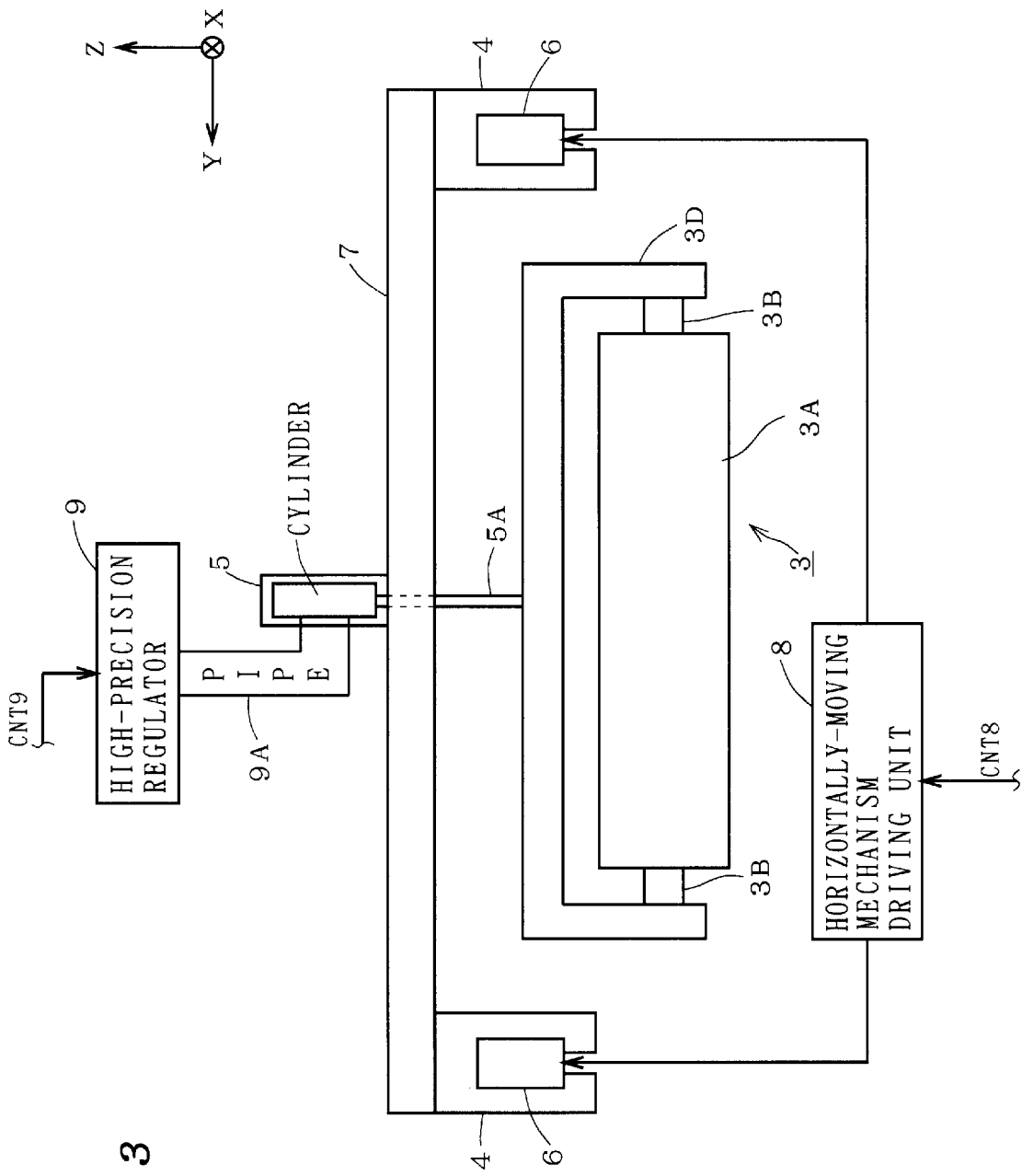
FIG. 3 is an elevation showing part of the panel fabrication apparatus.
Figure 4:
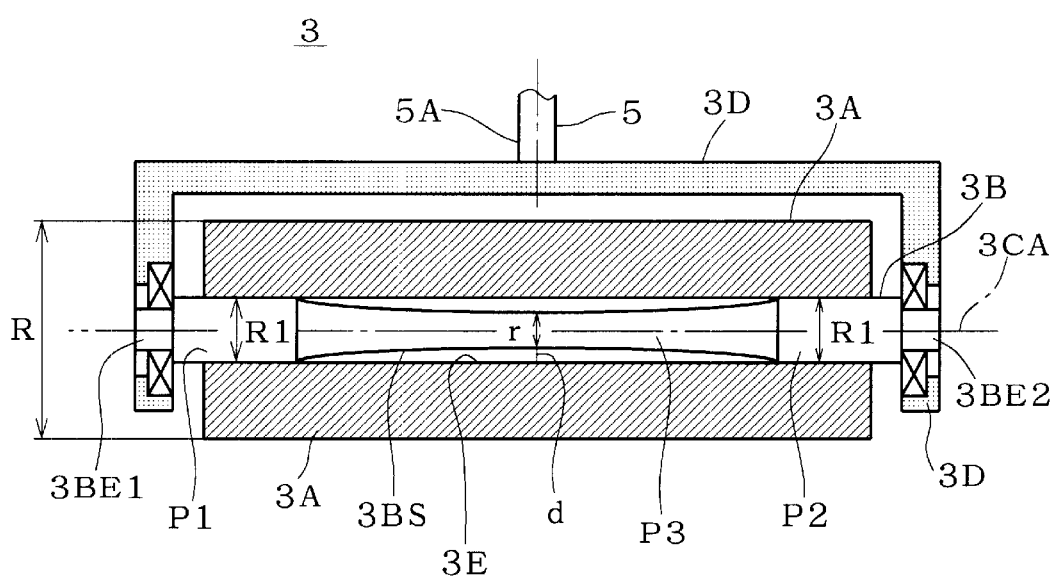
FIG. 4 is a cross section showing an internal constitution of a pushing roller unit.

FIG. 2 is a side view schematically showing a portion to which the functional film is affixed in the panel fabrication apparatus, and FIG. 3 is an elevation of the panel fabrication apparatus viewed by the arrow A1 of FIG. 2. FIG. 4 is a cross section schematically showing the pushing roller unit 3 in a state where the pushing roller unit 3 is cut from the ZY plane perpendicular to the paper of FIG. 2.

Furthermore, the basic constitution consisting of the pushing roller unit 3 and its peripheral mechanism shown in FIGS. 2 to 4 can be applied to the ultraviolet hardening-type resin bonding method as well as the adhesive bonding method.

In FIGS. 2 to 4, X, Y and Z directions are defined as the first direction or the roller travelling direction, the second direction and the third direction, respectively.

As shown in FIG. 2, the cathode-ray tube 1 is fixed with the spherical surface 1S (the surface to which the functional film is affixed) of the panel 1A facing upward (the +Z direction). Above the panel 1A, the pushing roller unit 3 to affix the functional film 2 by pushing is attached to a support arm plate 7 united with horizontally-moving mechanism 4.

Figure 35:
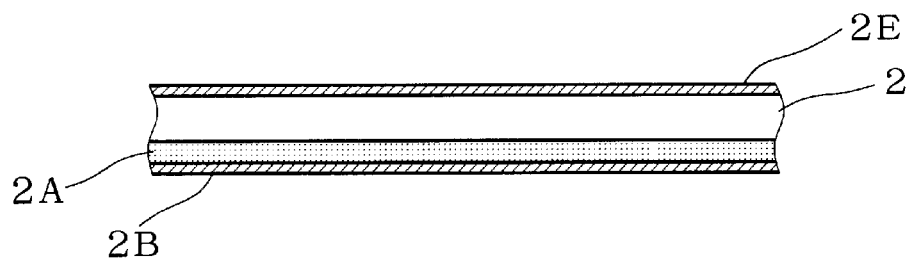
FIG. 35 is a view showing a constitution of the functional film.
Figure 36:
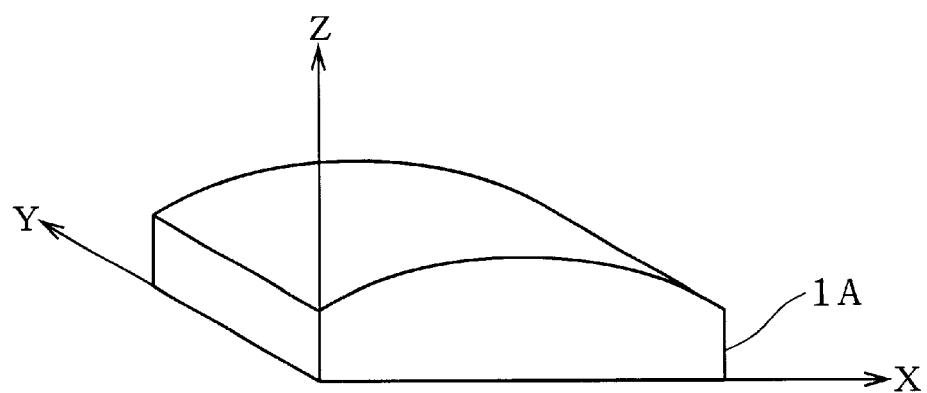
FIG. 36 is a view illustrating a panel surface having a curvature in two dimensional directions.

Though the functional film 2 has the adhesive 2A as shown in FIG. 35, the above adhesive 2A is not shown in FIG. 2, nor in some figures referred to below.

As shown in FIGS. 2 and 3, the concave horizontally-moving mechanisms 4 are fixed at both the end portions of the support arm plate 7, and the lower portions of the mechanisms 4 are slidably engaged on rails or guides 6 disposed in parallel with each other in the X direction. Each end of both the rails 6 is fixed, though not shown. The mechanism 4, receiving a driving force of a driving unit 8 including a motor and the like which starts operating in response to a control signal CNT8 given from a control panel discussed later, slides on the rail 6 in the roller travelling direction i.e., in the X direction. The pushing roller unit 3 thereby horizontally travels in the roller travelling direction X.

Instead of such an LM guide constitution, there may be a constitution where two linear shafts are disposed in parallel along the X direction and the horizontally-moving mechanism 4 is threadingly engaged in each linear shaft to move the pushing roller unit 3 in the roller travelling direction X.

Further, instead of ball-screw driving, timing-belt driving may be used to horizontally move the pushing roller unit 3.

An elevation mechanism 5 is attached to the support arm plate 7 and has a pressure source (a cylinder in this example) inside. The cylinder is driven by a pressure which is controlled by a pressure control high-precision regulator 9 piped to the cylinder through a pipe 9A, and the mechanism 5 propagates the driving force to a holding part 3D of the pushing roller unit 3 through a tip portion SA of the mechanism 5 connected to the cylinder, by which the pushing roller unit 3 is moved up and down in the vertical direction (±Z direction in FIG. 3).

The pushing roller unit 3 includes a tubular elastic roller 3A, as a heart of constitution, having an outer diameter R made of, for example, conductive silicon rubber, as shown in FIG. 4. The elastic roller 3A has an center hole 3E having an inner diameter Ri and penetrating both end surfaces of the roller 3A around its center axis (axis) 3CA. A center axis (shaft) 3B is inserted into the center hole 3E of the elastic roller 3A, and both end portions 3BEi and 3BE2 of the shaft 3B extending off the center hole 3E are rotatably supported by the holding part 3D connected to the tip portion SA of the elevation mechanism 5 in the pushing roller unit 3. With this constitution, the force that the mechanism 5 pushes down is propagated to the elastic roller 3A as the pushing pressure.

There is a clearance d between the inner diameter Ri of the elastic roller 3A or a wall surface of the center hole 3E and an outer diameter r of part of inserted portion of the shaft 3B or an outer surface 3BS. The shaft 3B has the following configuration. Specifically, an outer surface 3BS of the third portion P3 of the shaft P3 is formed into a concave configuration so as to have a curvature approximate to that of the surface 1S of the panel 1A in the YZ plane perpendicular to the roller travelling direction X. Other inserted portions which sandwich the third portion P3 are the first and second portions P1 and P2 each having almost the same outer diameter as the inner diameter R1. Therefore, the largest diameter of the shaft 3B is almost the same as the diameter of the center hole 3E of the elastic roller 3A. The curvature of the outer surface of the third portion P3 of the shaft 3B depends on that of the panel surface in the plane perpendicular to the roller travelling direction.

For example, in a case of a Braun tube which diagonally measures seventeen inches, having a curvature of about 1000, the clearance d is set to about 1 mm.

Figure 5:
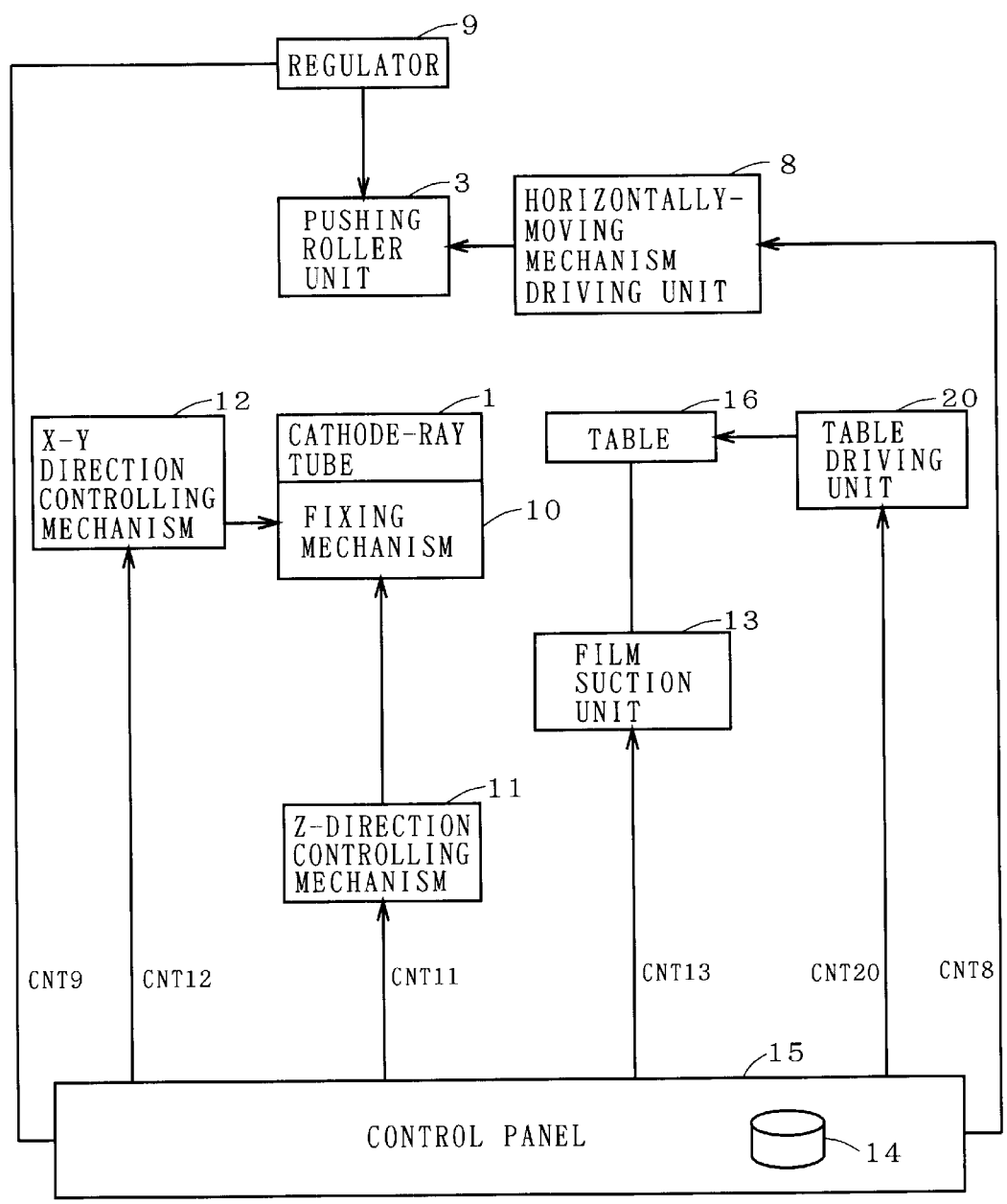
FIG. 5 is a block diagram showing a control system for the panel fabrication apparatus in accordance with the first preferred embodiment of the present invention.

FIG. 5 is a block diagram schematically showing a control system in the panel fabrication apparatus. Elements represented by the reference numerals 10 to 13, 8, 9 and 20 discussed later are driven in response to control signals CNT1 to CNT13, CNT8, CNT9 and CNT20 given by the control panel 15. The control panel 15 itself is controlled by a control program stored in a disk or a memory unit 14.

Next, discussion will be presented, with reference to FIGS. 2 to 5, on a method using the panel fabrication apparatus of the first preferred embodiment, for affixing the functional film 2 on the surface 1S of the panel 1A of the cathode-ray tube 1.

Figure 6:
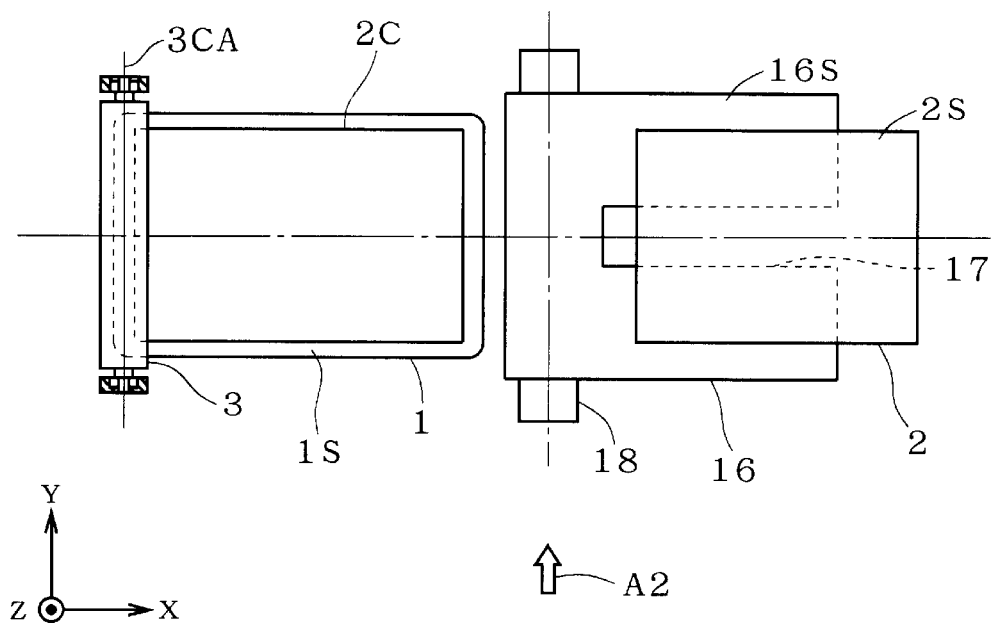
FIGS. 6 to 10 are step views of a panel fabrication method.

FIG. 6 is a plan view of the panel surface 1S viewed from the Z direction. First, the cathode-ray tube 1 is temporally fixed by a fixing mechanism 10 with the panel surface 1S of the cathode-ray tube 1 facing upward, and the height of the panel 1A is controlled by a Z-direction controlling mechanism 11 so that the horizontal level of the panel surface 1S may correspond to that of the pushing roller unit 3. After control, the cathode-ray tube 1 is properly fixed only in the vertical direction by the fixing mechanism 10.

Figure 7:
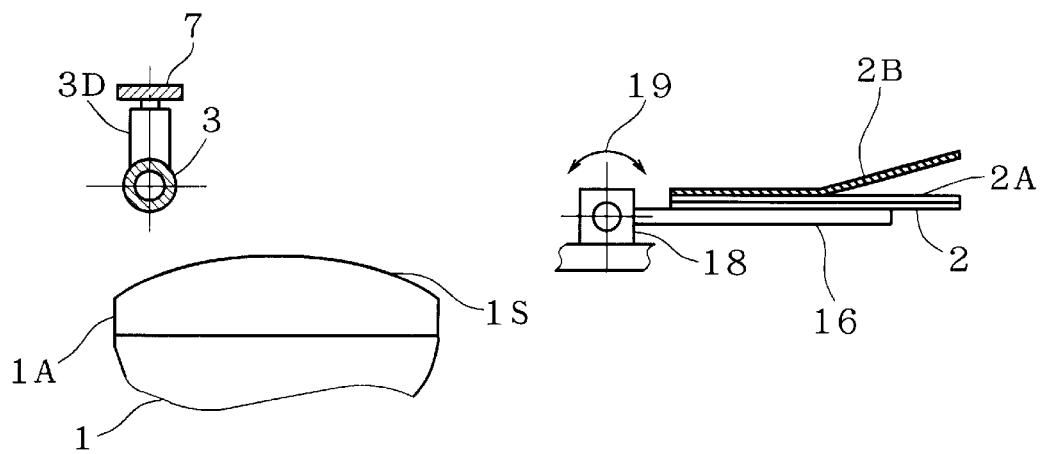
Figure 8:
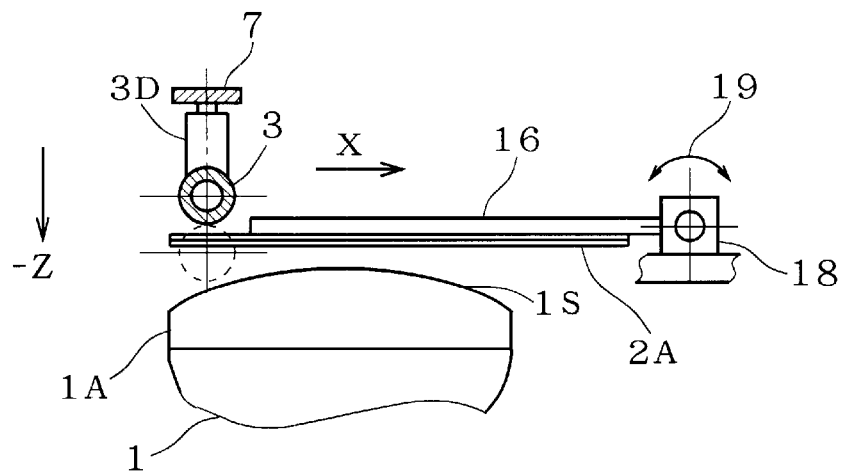

Next, the functional film 2 with the adhesive 2A of FIG. 35 on one surface (the first film surface 2S) side is provided. The functional film 2 is put on a mounting surface 16S of an affixing table 16 with the first film surface 2S having the adhesive 2A facing upward, positioned, and fixed by suction with a suction unit 13. The suction force is applied so that the functional film 2 can be drawn from the mounting surface 16S when affixed by pushing as discussed later. After suction, the release paper 2B covering an upper surface of the adhesive 2A is removed as shown in FIG. 7. FIG. 7 and FIG. 8 discussed later are side views viewed from the arrow A2 of FIG. 6.

As shown in FIG. 6, a notch 17 is provided in the affixing table 16 from a center portion of its one end towards the other end side. With this notch 17, it is possible to avoid occurrence of contact of the pushing roller unit 3 with the affixing table 16, though within a certain range of travel, when the pushing roller unit 3 travels while pushing the functional film in the roller travelling direction X.

As shown in FIGS. 6 and 7, the other end of the affixing table 16 is connected to a rotation mechanism 18 which receives the driving force of a table driving unit 20 (a motor and the like) to rotate the affixing table 16 in a direction 19, i.e., clockwise and counterclockwise.

Next, as shown in FIG. 8, the driving mechanism 20 is started to operate and controlled to rotate the affixing table 16 by about 180 degrees so that the functional film 2 after removing the release paper 2B may be arranged with its one side having the adhesive 2A facing downward and the surface 1S of the panel 1A of the cathode-ray tube 1 may not come in contact with an lower surface of the functional film 2. After turning around, in order to make an alignment of the panel 1A of the cathode-ray tube 1 with the functional film 2, an X-Y positioning and fixing mechanism 12 makes an positioning of the cathode-ray tube 1 or the panel 1A in the X and Y directions of FIG. 8 and fixes it. At this time, the surface 1S of the panel 1A is not in touch with the functional film 2.

Figure 9:
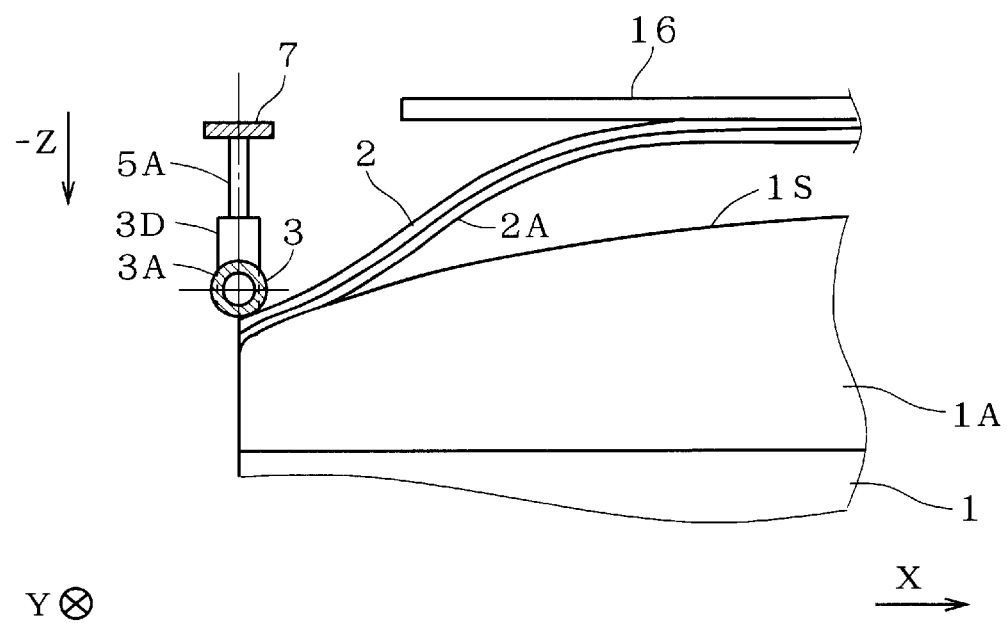

As shown in FIG. 9, the pushing roller unit 3 is lowered by the driving force of the elevation mechanism 5 to bring the elastic roller 3A in touch with one end surface of the functional film 2 out of the range defined by an effective frame 2C in the panel 1S, and thereby the one end surface of the functional film 2 is pushed against the corresponding surface 1S of the panel 1A and the functional film 2 is temporally fixed. After the temporary fixing, as shown in FIG. 9, the affixing table 16 is rotated clockwise by a predetermined degree by driving the table driving unit 20 so as not to interfere with an operating range of the pushing roller unit 3 in its travelling direction.

Figure 10:
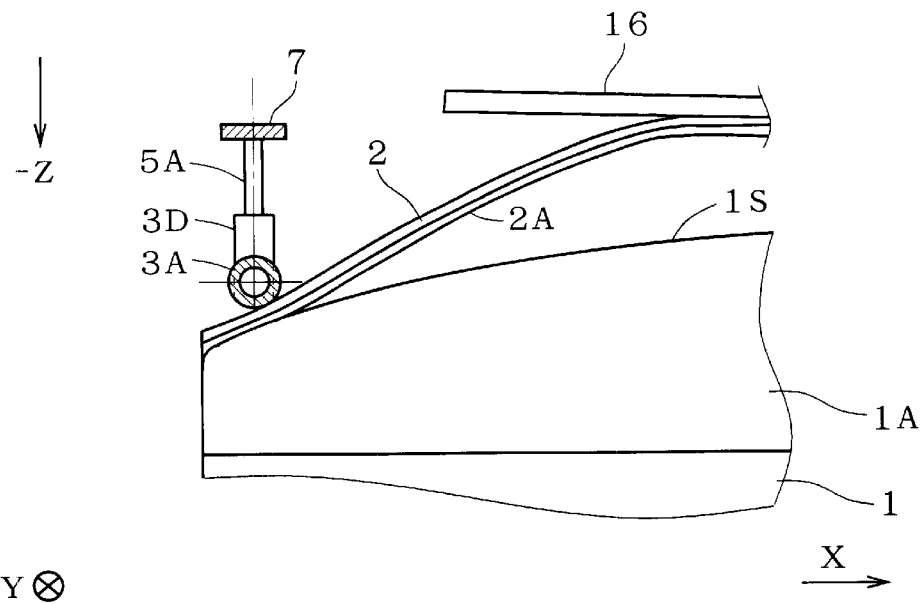

After turning the affixing table 16 aside, as shown in FIG. 10, the pushing roller unit 3 travels in the travelling direction X while pushing the functional film 2, to affix the functional film 2. At this time, in response to the movement of the pushing roller unit 3, the affixing table 16 is intermittently rotated clockwise.

In this case, since the pushing roller unit 3 has the clearance d as discussed earlier, as shown in FIG. 11, a pushing surface of the elastic roller 3A is deformed along the curvature in the YZ plane perpendicular to the roller travelling direction X in the panel surface 1S, and as a result a thickness D2 of the top portion of the elastic roller 3A is almost the same as thicknesses D1 and D3 at both the end portions and the pushing pressure that the elastic roller 3A applies to the functional film 2 becomes almost uniform in the YZ plane, to thereby ensure excellent affixing of the functional film.

The elastic roller 3A is easily deformed along the curvature of the panel surface 1S in the YZ plane because there is the clearance d between the shaft 3B and the center hole 3E of the elastic roller 3A and the amount of clearance is almost the same as the height difference between the bottom and the other portions of the panel surface 1S to which the functional film 2 is affixed.

Figure 12:
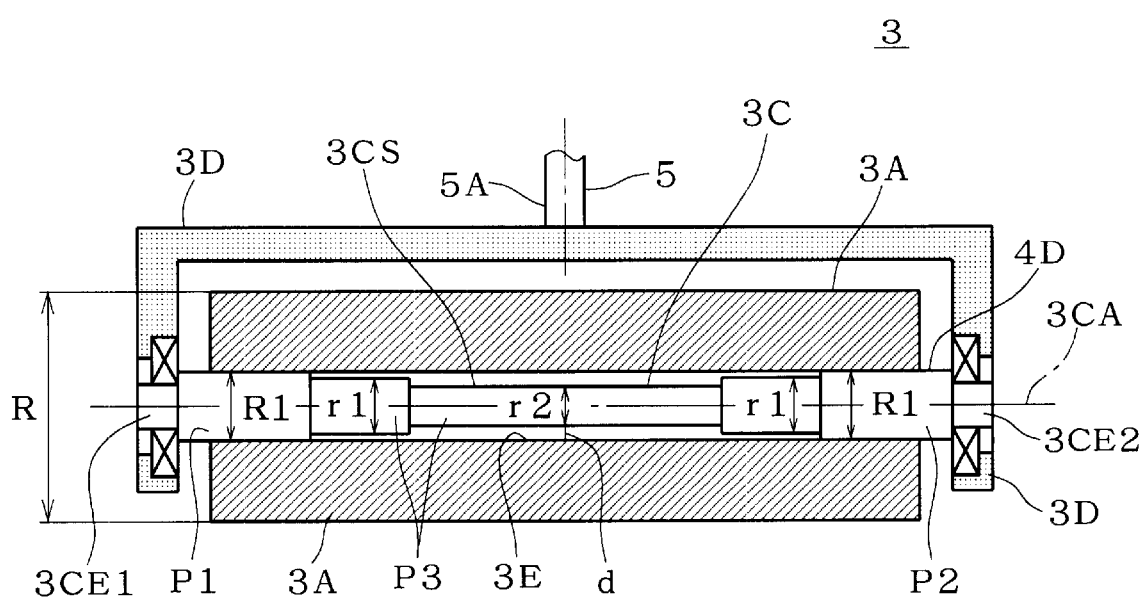
FIG. 12 is a cross section of a modification of the pushing roller unit.

Furthermore, instead of the shaft 3B of FIG. 4, a shaft 3C of FIG. 12 may be used. Specifically, the third portion P3 of the shaft 3C has at least one step (in this figure, two steps having outer diameters r1 and r2) approximate to the curvature of the panel surface 1S in the YZ plane perpendicular to the roller travelling direction. The number of steps and the amount of step and the pitch are appropriately determined according to the curvature of the panel surface 1S.

Figure 11:
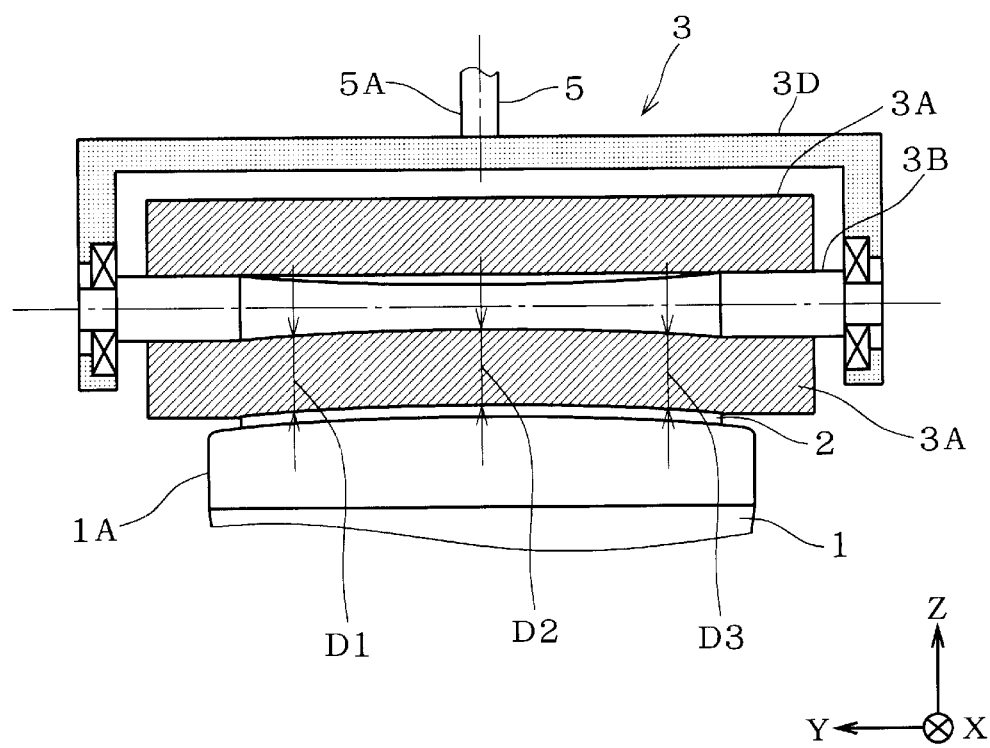
FIG. 11 is a cross section showing a state where the pushing roller unit applies pressure.

When the functional film 2 is pushed against the panel surface 1S by using the shaft 3C, though the thicknesses of portions of the elastic roller 3A are not such as shown in FIG. 11 where the thicknesses D1 to D3 of the elastic roller 3A become almost equal, the pushing pressure against the panel surface 1S in the YZ plane becomes more uniform than that of the background art. Further, since it is advantageous that the processing of the shaft 3C is easier than that for the shaft 3B of FIG. 4, the use of the pushing roller unit of FIG. 12 produces a great effect.

As for all-inclusive features of the shafts 3B of FIG. 4 and 3C of FIG. 12, it is defined that the outer surface is determined on the basis of the curvature of the panel surface in the plane perpendicular to the roller travelling direction.

Figure 33:
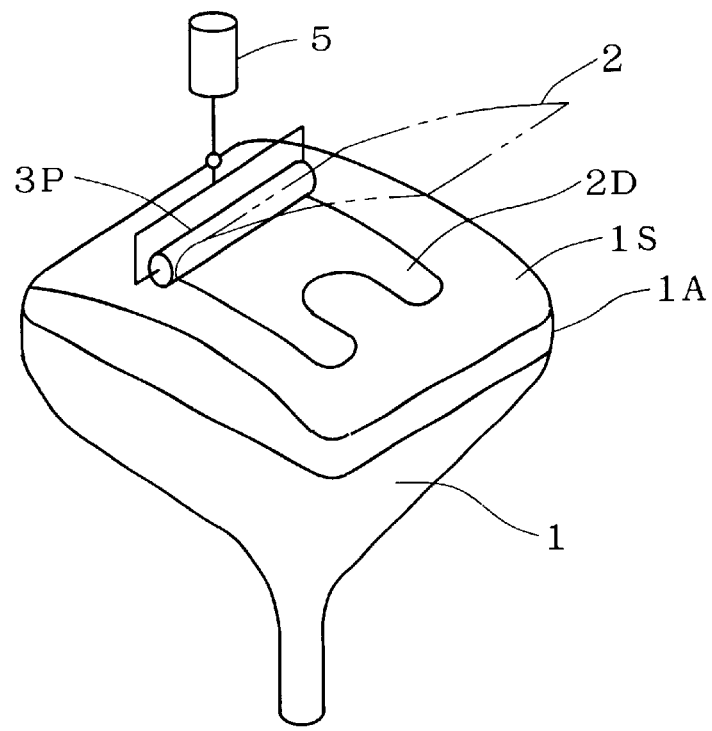
FIG. 33 is a schematic view showing a method of affixing a functional film by using an ultraviolet hardening resin in the background art.
Figure 34:
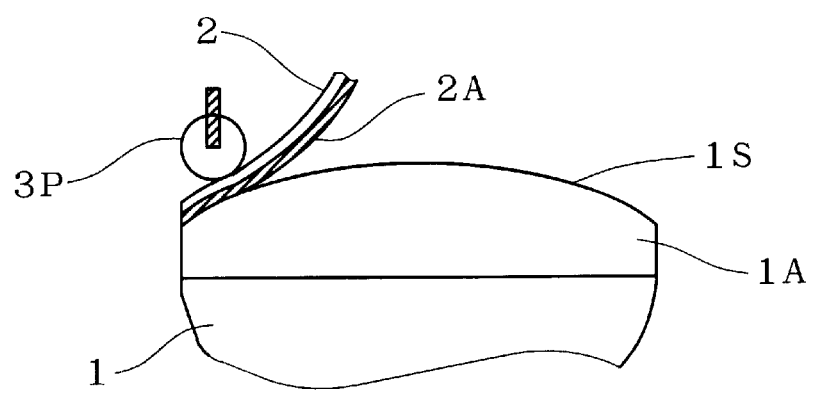
FIG. 34 is a schematic view showing a method of affixing a functional film by using an adhesive in the background art.

The inventors of the present invention demonstrate a difference in pushing pressure for affixing the film on the panel surface 1S without defect (in other word, uniformly) between the background art (the solid pushing roller unit 3P of FIGS. 33 and 34) and the hollow pushing roller unit 3, through an experiment. The comparison result is presented in FIG. 13.

Test conditions are as follows:

① Both the solid-type roller and the hollow-type roller use the same rubber material and hardness.
② The functional film 2 of FIG. 35 is used.
③ The tolerance level of the pushing pressure is determined not more than the empty weight of the cathode-ray tube in this test constitution.

Figure 14:
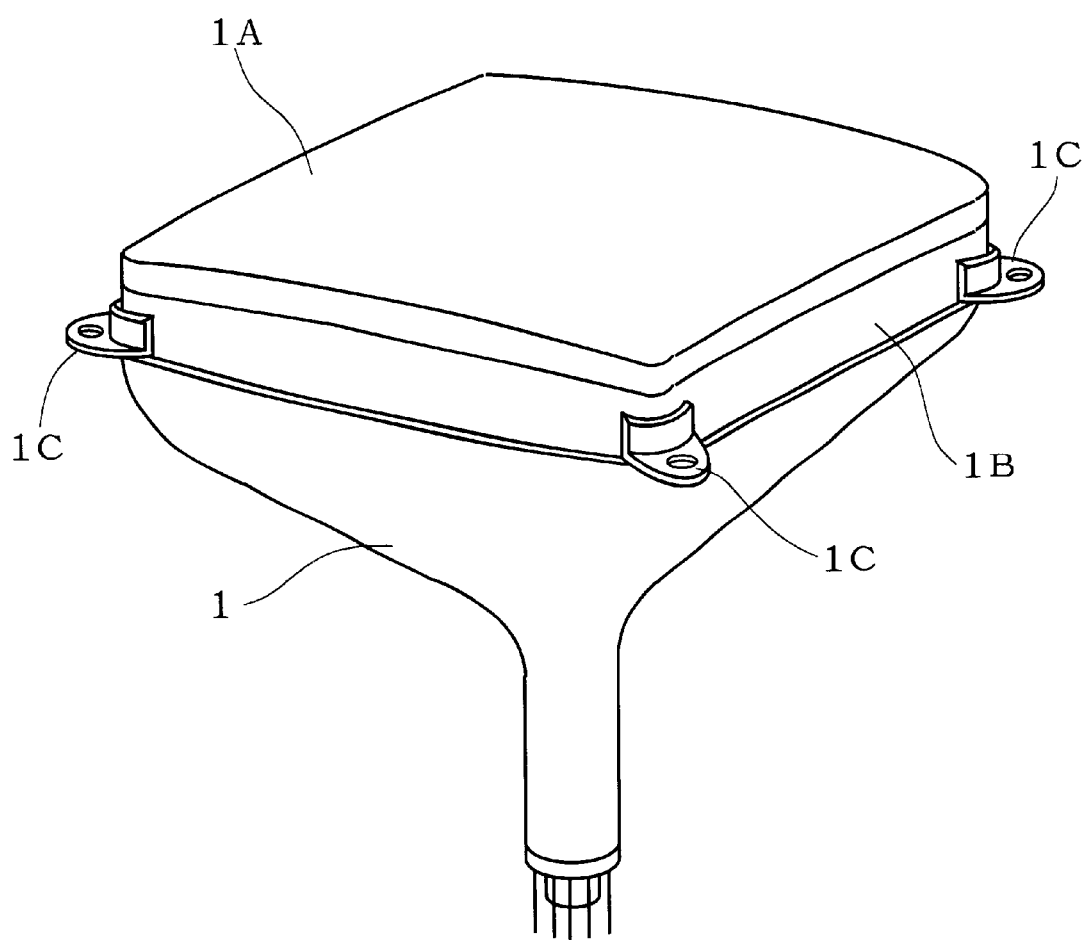
FIG. 14 is a perspective view showing how to fix a cathode-ray tube in a test.

The constitution for this test is shown in FIG. 14. Specifically, an explosion-proof band 1B is wound around an outer wall of the panel of the cathode-ray tube 1, and the cathode-ray tube 1 is supported by lugs 1C attached on the comers of the band 1B. Then, the pushing pressure for affixing is measured. In this case, if the pushing pressure for affixing exceeds the empty weight of the cathode-ray tube, the lugs IC are deformed and this is judged as NG. Thus, the superiority or inferiority of both roller units is determined.

As is clear from the result of FIG. 13, the pushing pressure in using the pushing roller unit 3 of the present invention is one-third or half of that in using the background-art pushing roller unit 3P. Moreover, all the judgments on the background art are NG. This means that it is possible to make the pushing pressure in the YZ plane uniform when the pushing roller unit 3 of the present invention is used.

As discussed above, the panel fabrication apparatus of the present invention uses the tubular elastic roller which is provided with a clearance between the outer surface of the shaft and the wall surface of the center hole by inserting the shaft having the concave curvature approximate to the curvature in the plane perpendicular to the roller travelling direction of the panel surface or having at least one concave step approximate to the curvature in the central hole of the elastic roller, in affixing the functional film on the panel surface of the cathode-ray tube. That allows easy deformation of the elastic roller along the curvature in the plane perpendicular to the roller travelling direction of the panel surface when the functional film is pushed to be affixed. At this time, the elastic roller 3A has almost the same amount of deformation and variation in thickness in any portions. Therefore, the roller pressure is made almost uniform on the whole surface of the panel in the plane perpendicular to the roller travelling direction.

As a result, in the ultraviolet hardening-type resin bonding method, the thickness of an ultraviolet hardening-type resin layer is made almost uniform in the plane perpendicular to the roller travelling direction and air bubbles are readily removed and therefore it becomes possible to provide the panel with the functional film affixed on its surface uniformly with high quality.

Also in the adhesive bonding method, the roller pressure against the panel surface in the plane perpendicular to the roller travelling direction becomes almost uniform, and therefore no surface which is not bonded exists, air bubbles are not easily produced and the functional film can be uniformly affixed.

Herein, the ultraviolet hardening-type resin 2D (in FIG. 33) used in the ultraviolet hardening-type resin bonding method and the adhesive agent 2A (in FIG. 34) used in the adhesive bonding method are generally termed as "bonding source". This also applies to the second preferred embodiment as discussed later.

Furthermore, if based on the concept that the clearance d is provided by modifying the outer configuration of the shafts 3B and 3C as shown in FIGS. 4 and 12, there may be an idea that the thickness of the solid elastic roller with no clearance in the background art is changed in advance along the curvature of the above panel surface. In this method, however, the elastic rubber must be processed with precision of, for example, 1/100 mm and another problem of difficulty in processing arises. In this point, the shaft can be processed easily with high precision and therefore the methods of FIGS. 4 and 12 are practical techniques.

2. The Second Preferred Embodiment

Figure 15:
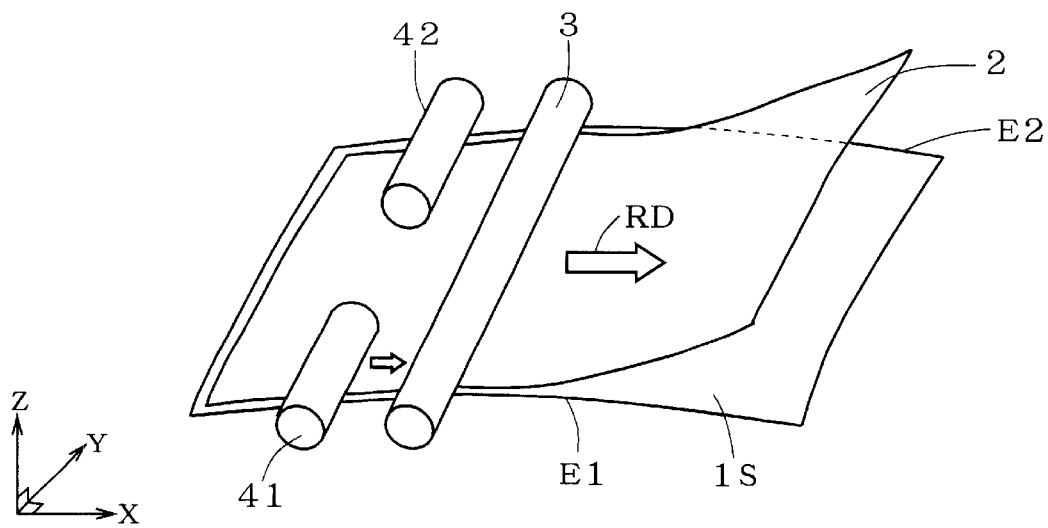
FIG. 15 is a view showing the basic concept of a second preferred embodiment of the present invention.

In the second preferred embodiment, a panel surface of a cathode-ray tube is adopted as a panel having a surface with a curvature in three dimensional directions. An outline of a technique in this preferred embodiment is schematically shown in FIG. 15. With reference to FIG. 15, the essence of the technique in this preferred embodiment will be discussed below.

Specifically, in affixing the functional film 2 on the panel surface 1S (spherical surface) of the cathode-ray tube by the main pushing roller unit 3, in order to make the roller pressure almost uniform at the first and second end portions E1 and E2 in the panel surface intersecting the YZ plane perpendicular to the roller travelling direction RD (X), the first and second follow-up displacement pushing roller units 41 and 42 are disposed behind the main pushing roller unit 3 and above the first and second end portions E1 and E2, respectively, viewed from the roller travelling direction RD, and the first and second follow-up displacement pushing roller units 41 and 42 follow the main pushing roller unit 3, being displaced in response thereto, along the curvature in the roller travelling direction RD on the sides of both the end portions E1 and E2. Therefore, on the sides of both the end portions E1 and E2, the functional film 2 is first subjected to the pushing pressure (main pressure) by the main pushing roller unit 3 and then subjected to the first and second pushing pressures by the follow-up displacement pushing roller units 41 and 42, respectively. Thus, applying an optimum pushing pressure, the functional film 2 can be affixed almost uniformly.

Further, the first and second follow-up displacement pushing roller units 41 and 42 may be modified as follows. Specifically, the roller units 41 and 42 are each provided with a roller holding part having an equalizer function so that the roller surfaces of the roller units 41 and 42 can push the panel surface 1S with optimum angle according to variation of curvature along the roller travelling direction on the sides of both the end portions E1 and E2 of the panel surface 1S.

Furthermore, a clearance may be provided between the center hole of the roller made of a tubular elastic rubber in each of the roller units 41 and 42 and the center axis (shaft) inserted into the center hole.

The equalized amount of the equalizing mechanism, the hardness of the elastic rubber roller and the attachment positions (angle and pitch) of the first and second follow-up displacement pushing roller units 41 and 42 depend on the curvatures and their variations at the end portions E1 and E2 in the panel YZ perpendicular to the roller travelling direction RD in the panel surface 1S of the cathode-ray tube.

When each curvature at the end portions E1 and E2 along the roller travelling direction has little displacement, even if the panel surface 1S has the curvature in three dimensional directions, the functional film 2 may be affixed on the panel surface 1S by interlock operation of the roller units 3, 41 and 42 with the equalizing mechanism fixed.

A high-precision pressure control regulator which controls the pressure for each pushing roller unit independently may be provided so that each pressure of the roller units 3, 41 and 42 can be controlled independently.

Even in a case of spherical panel surface as shown in FIG. 37, the same effect as the case of FIG. 15 can be produced by the method in which at first only the first follow-up displacement pushing roller unit 41 and the main pushing roller unit 3 travel while pushing the functional film 2 in the roller travelling direction RD to correct imperfection in affixing the functional film 2 due to the curvature in the YZ plane on the side of the first end portion E1, and next their positional relation of the roller units 3 and 41 is changed so that the roller unit 41 may be disposed behind the pushing roller unit 3 viewed from the direction (−X) opposite to the roller travelling direction RD and they may be positioned above the side of the second end portion E2 and the main pushing roller unit 3 travels, followed by the roller unit 41, in response to each other along the direction (−X) opposite to the roller travelling direction, to affix the functional film 2 on the panel surface 1S. In this case, only one follow-up displacement pushing roller unit is needed though more steps and time are required for fabrication.

Further, when the panel has a curvature locally in the YZ plane only on the side, for example, of the first end portion E1, the second follow-up displacement pushing roller unit 42 is naturally not needed.

More specific and detailed discussion will be presented below on the panel fabrication apparatus of FIG. 15 and the panel fabrication method using the apparatus.

The pushing roller mechanism of the second preferred embodiment can be used for both the ultraviolet hardening-type resin boding method and the adhesive bonding method, like the first preferred embodiment. The latter bonding method will be taken in the following example.

Figure 16:
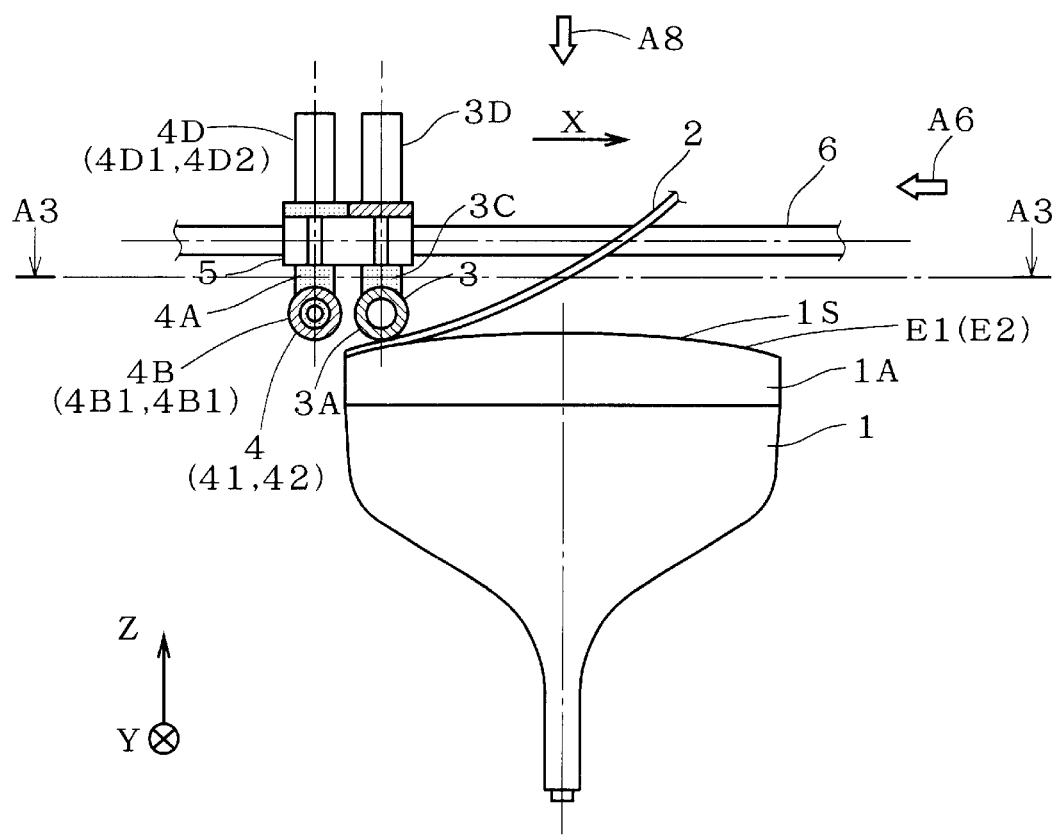
FIG. 16 is a view showing part of constitution of a panel fabrication apparatus in accordance with the second preferred embodiment of the present invention.
Figure 17:
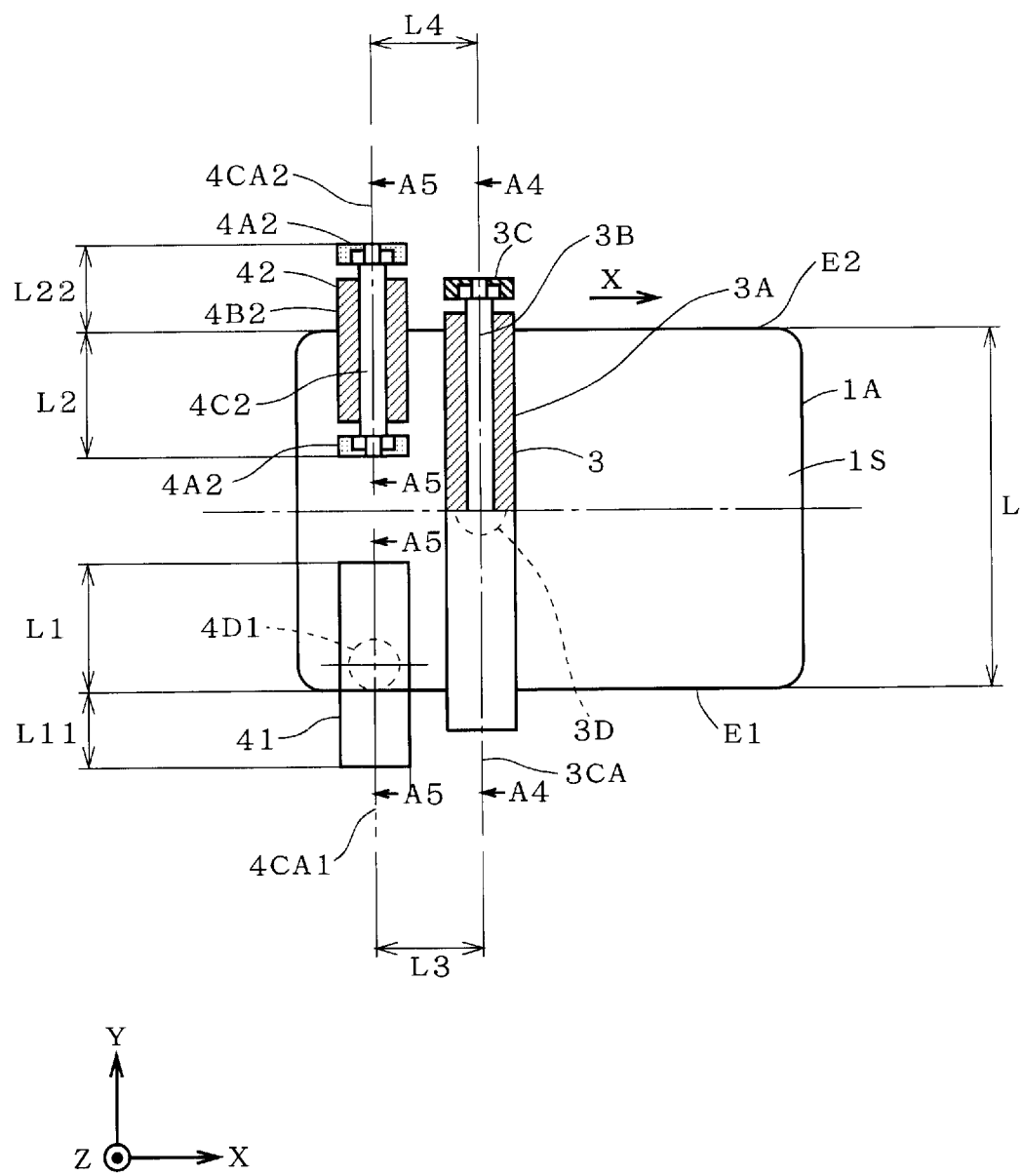
FIG. 17 is a schematic view showing positional relation and constitution of a main pushing roller unit and the first and second follow-up displacement pushing roller units.
Figure 18:
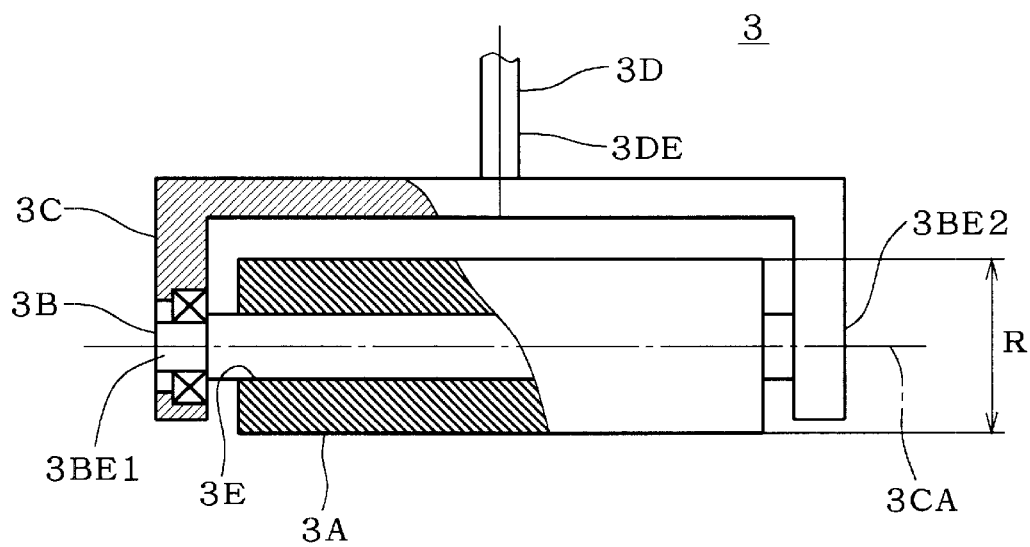
FIG. 18 is a cross section of the main pushing roller unit in accordance with the second preferred embodiment of the present invention.
Figure 19:
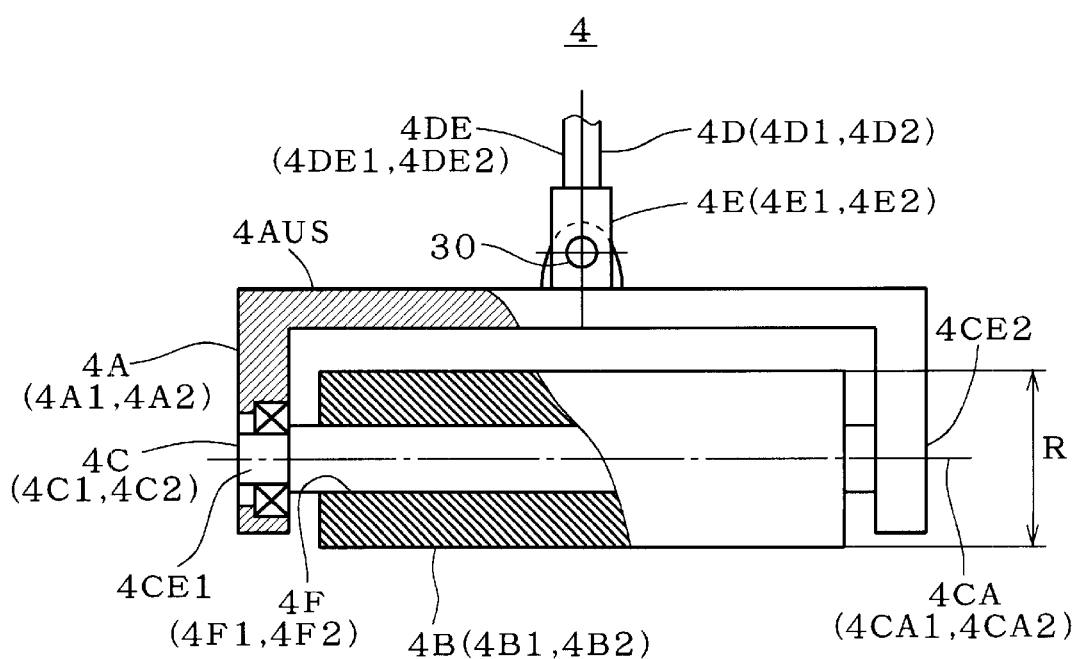
FIG. 19 is a view showing a schematic mechanism of the first (or second) follow-up displacement pushing roller unit.
Figure 20:
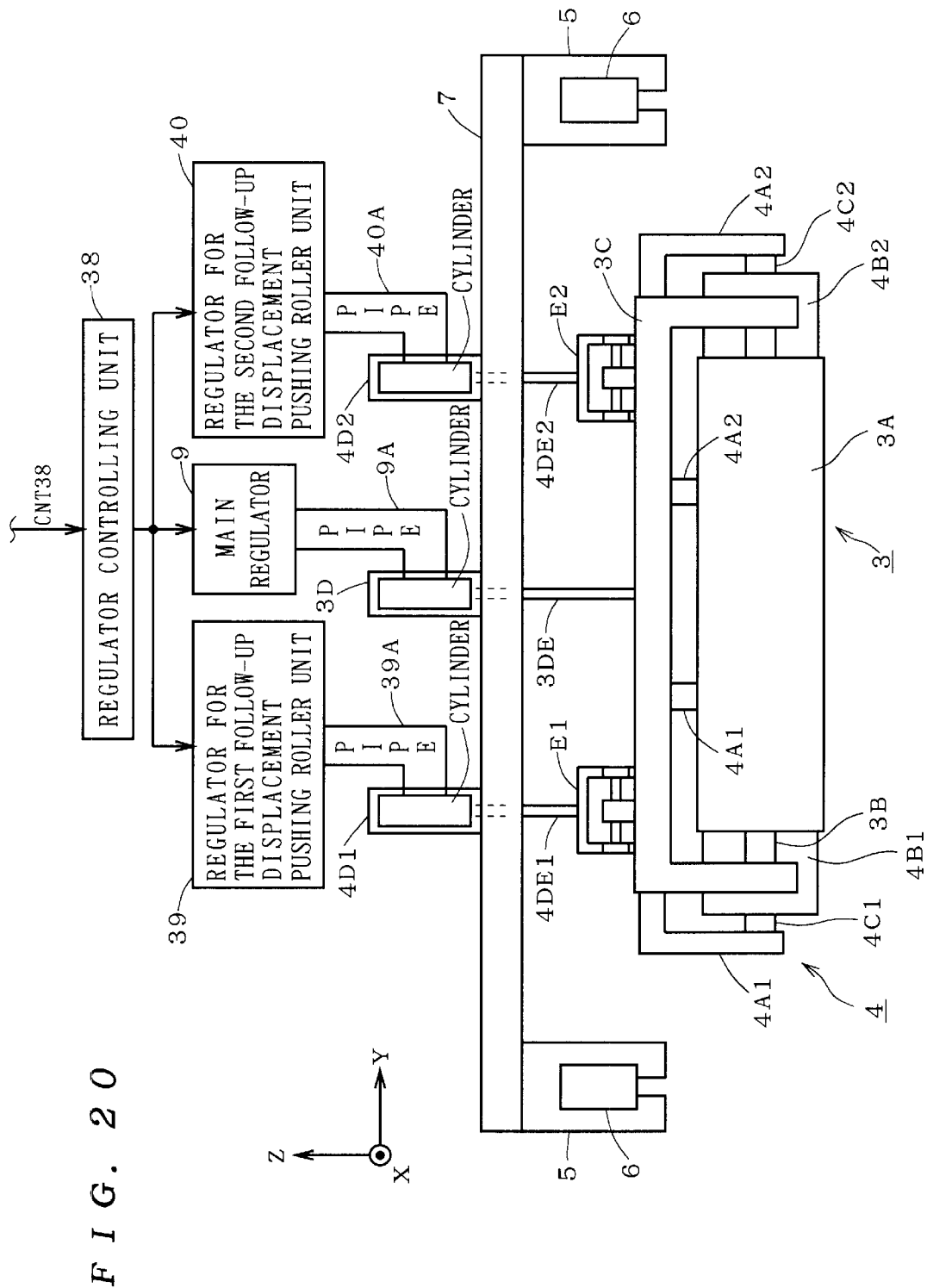
FIG. 20 is an elevation of the panel fabrication apparatus.
Figure 21:
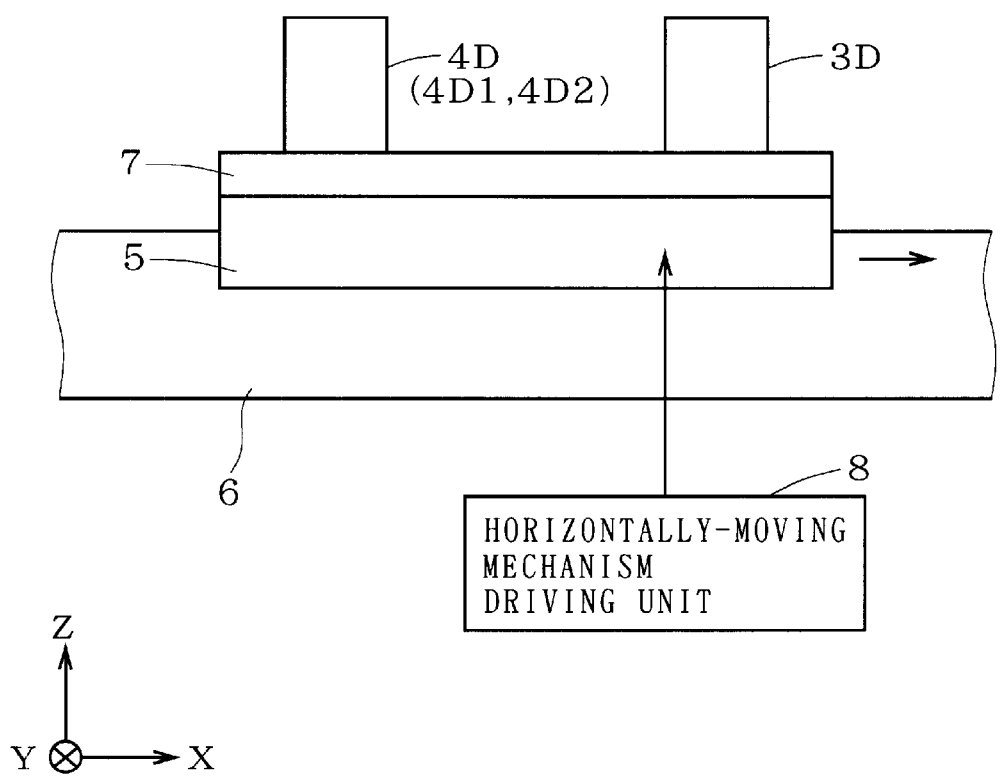
FIG. 21 is a side view of the panel fabrication apparatus.

FIG. 16 is a schematic side view of a part of the panel fabrication apparatus of the second preferred embodiment for affixing the functional film, and FIG. 17 is a schematic plan view of constitution and positional relation of the main pushing roller unit 3 and the first and second follow-up displacement pushing roller units 41 and 42 viewed from the arrow A3 of FIG. 16, part of which is shown as a section. Herein, the first and second follow-up displacement pushing roller units 41 and 42 are generally termed as the follow-up displacement pushing roller unit 4. FIG. 18 is a cross section of the main pushing roller unit 3 viewed from the arrow A4 of FIG. 17 while FIG. 19 is a cross section of the follow-up displacement pushing roller unit viewed from the arrow A5 of FIG. 17. FIG. 20 is an elevation of the horizontally-moving mechanism 5, the rail 6 and the like viewed from the arrow A6 of FIG. 16 while FIG. 21 is a side view of the mechanisms 5 and 6 viewed from a direction perpendicular to the paper, i.e., −Y direction of FIG. 16.

Though FIGS. 16 to 21 shows an apparatus for affixing the functional film by using the adhesive bonding method, the basic constitutions of the main pushing roller unit 3 and follow-up displacement pushing roller unit 4 (41, 42) can be applied to the ultraviolet hardening-type resin bonding method as well.

As shown in FIG. 16, the cathode-ray tube 1 is fixed with the surface 1S of the panel 1A facing upward (+Z direction). Above the panel 1A, the main pushing roller unit 3 which applies a pressure (main pressure) to the functional film 2 to affix the functional film 2 onto the panel surface 1S through the adhesive and the first and second follow-up displacement pushing roller units 41 and 42 disposed on the sides of the first and second end portions E1 and E2 of the panel surface 1S, respectively, behind the main pushing roller unit 3 viewed from the travelling direction X of the main pushing roller unit 3 are attached separately at the first, second and third portions of the support arm plate 7, respectively. The horizontally-moving mechanism 5 connected to both end portions of the support arm plate 7 supporting the roller units 3 and 4 is engaged slidably in the rails or guides 6 disposed in parallel with the X direction so that the main pushing roller unit 3 may horizontally travel while pushing the functional film 2 in the roller travelling direction (+X direction in FIG. 16), followed by the follow-up displacement roller units 4. The constitution of the roller units 3 and 4 associated with the horizontally-moving mechanism is basically the same as that of the first preferred embodiment, except that the two follow-up displacement pushing roller units 4, as well as the main pushing roller unit 3, are attached to the support arm plate 7 so as to move in response to the main pushing roller unit 3, and similarly, a linear shaft may be used, instead of the LM guide.

As shown in FIGS. 17 and 18, the main pushing roller unit 3 consists of the tubular main elastic roller 3A of outer diameter R made of, for example, conductive silicon rubber and having the center hole 3E, the center axis, i.e., the shaft 3B inserted partially in the center hole 3E of the main elastic roller 3A, a main elastic roller holding part 3C supporting rotatably both end portions 3BE1 and 3BE2 of the shaft 3B extending off the center hole 3E and a main pushing part 3D connected to the main elastic roller holding part 3C at a top portion 3DE and having a main cylinder to apply the main pressure. The main pushing part 3D is attached to the first portion of the support arm plate 7.

As shown in FIGS. 16, 17, 20 and 21, the first and second follow-up displacement pushing roller units 4 (41, 42) are displaced independently behind the main pushing roller unit 3 viewed from the roller travelling direction +X and above the panel surface 1S intersecting the YZ plane perpendicular to the roller travelling direction X on the sides of the first and second end portions E1 and E2, respectively.

Specifically, the first follow-up displacement pushing roller unit 41 is fixed to the second portion of the support arm plate 7 so that the center axis of the first pushing part 4D1 may be positioned on the side of the first end portion E1 behind (in the −X direction) away from the main pushing roller unit 3 by the third distance L3 as a center axis distance and has a longitudinal length (L1+L11) in parallel with the Y direction. As to the distance L11 of the part extending off the first end portion E1, the relation $L11 \geq 0$ is hold. As to the first distance L1 from the end portion E1 to one end of the first follow-up displacement pushing roller unit 41 positioned on the panel surface 1S, the relation $L1>0$ is hold.

The second follow-up displacement pushing roller unit 42 is fixed to the third portion of the support arm plate 7 so that the second follow-up displacement pushing roller unit 42 is away from the main pushing roller unit 3 by the fourth distance L4 as a center axis to center axis distance in the −X direction and the center axis of the second pushing part 4D2 may be positioned above the second end portion E2. The second follow-up displacement pushing roller unit 42 has a longitudinal length (L2+L22) in parallel with the Y direction. As to the second distance L2 and the distance L22 of the part extending off the second end portion E2, the relations $L2>0$ and $L22 \geq 0$ are hold.

In this case, the relation of the third and fourth distances is L3=L4 and center axes 4CA1 and 4CA2 of the first and second follow-up displacement pushing roller units 41 and 42 are both in the YZ plane. Though usually L3=L4, the relation may be $L3 \neq L4$, where the first and second distances L1 and L2 are not confined to the range that $0<L1<L/2$ and $0<L2<L/2$.

As shown in FIG. 19, the follow-up displacement pushing roller unit 4 consists of an elastic roller holding part 4A having an equalizing mechanism (referred to as "equalizer" hereinafter) 4E, a tubular elastic roller 4B made of, for example, conductive silicon rubber and having a center hole 4F like the main pushing roller unit 3, a center axis (shaft) 4C partially inserted into the center hole 4F of the elastic roller 4B with both end portions 4CE1 and 4CE2 supported rotatably by the holding part 4A and a pushing part 4D (its top portion 4DE) which applies pressure of the follow-up displacement pushing roller unit. The reference sign 4CA represents a center axis of the elastic roller 4B.

Each element of the first and second follow-up displacement pushing roller units 4 is represented by the reference sign of FIG. 19 with the numeral 1 or 2 at the rightmost and the name as above with "the first" or "the second" at the head.

Figure 22:
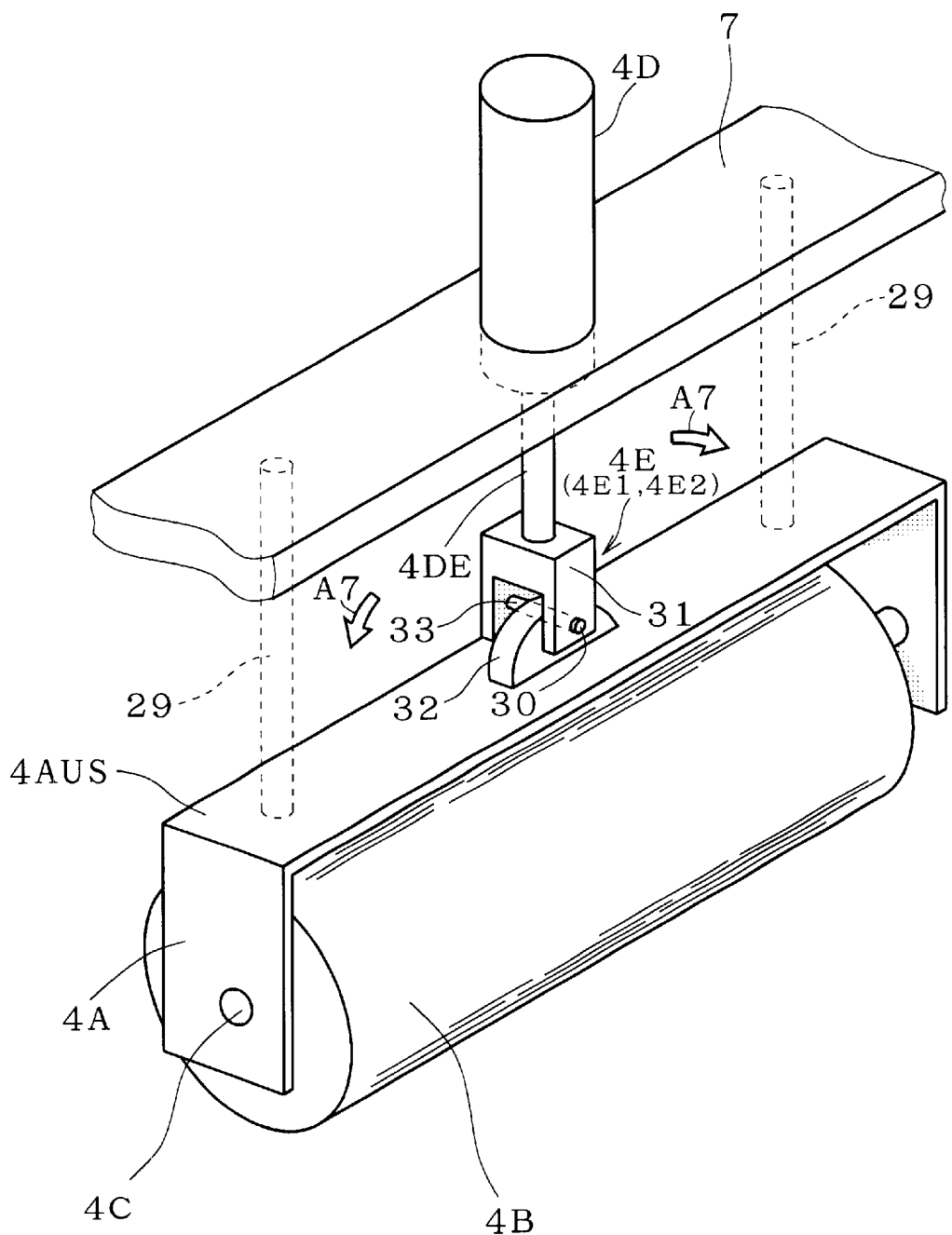
FIG. 22 is a perspective view of an equalizer.

As shown in the perspective view of FIG. 22 showing the follow-up displacement pushing roller unit 4, the equalizer 4 has a shaft 33, a concave plate 31 fixed at the top portion 4DE of the pushing part 4D and a holder 32 fixed at the center portion of an upper surface 4AUS of the holding part 4A for holding the shaft 33. The holder 32 is rotatable with the shaft 33 as one unit. In other words, both end portions of the shaft 33 are inserted in and rotatably supported by bearings 30 provided in the concave plate 31, respectively. The holder 32 and the shaft 33 thereby rotate in the direction indicated by the arrow A7 according to variation of the curvature of the panel surface 1S and change an inclination of the center axis 4CA of the elastic roller 4B.

The first and second equalizers 4E1 and 4E2 are optional elements, so when the curvatures of the first and second end portions E1 and E2 do not vary in the roller travelling direction X, no equalizer is needed, or the equalizer 4E may be fixed with a fixing mechanism 29 of FIG. 22 even if provided.

As shown in FIG. 20, pressure controlling high-precision regulators 9, 39 and 40 which independently adjust pressure applied to a corresponding one of cylinders are provided for the cylinders in the main pushing part 3D of the main pushing roller unit 3, the first pushing part 4D1 of the first follow-up displacement pushing roller unit 41 and the second pushing part 4D2 of the second follow-up displacement pushing roller unit 42 through pipes 9A, 39A and 40A, respectively. These regulators are controlled by a regulator controlling unit 38. Though the regulators 9, 39 and 40 are also optional elements, when the equalizers 4E are provided in the follow-up displacement pushing roller units 4, especially, providing the regulators 39 and 40 for the follow-up displacement pushing roller units 4 is practically advantageous because it is necessary to appropriately control the pressure applied to the cylinders of the follow-up displacement pushing roller units 4 so that the equalizers 4E may make the pressure uniform as the pressures at the first and second end portions E1 and E2 change according to variation in height of the end portions E1 and E2 along the roller travelling direction X. In short, as the pressure in the cylinder varies with change of the equalizer 4E, the regulator serves to make the pressure uniform.

Figure 23:
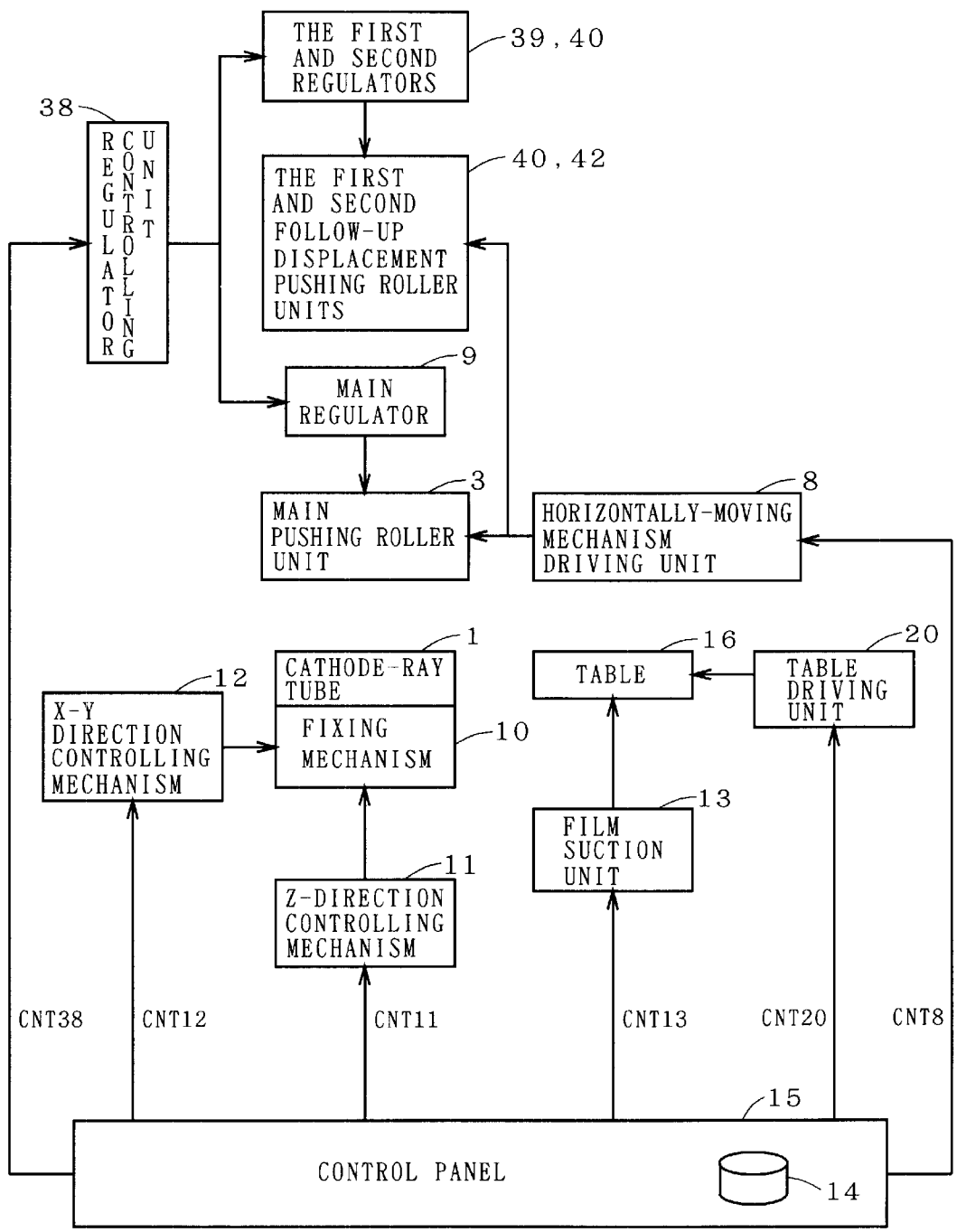
FIG. 23 is a block diagram showing a control system in accordance with the second preferred embodiment of the present invention.

FIG. 23 is a block diagram showing a control system of the apparatus of the second preferred embodiment. The control system is basically the same as that of FIG. 5, except that a control for hoisting and lowering the follow-up displacement pushing roller units 4 is added.

Next, discussion will be made on a method of affixing the functional film 2 on the surface 1S of the panel 1A by using the apparatus of the second preferred embodiment.

Figure 24:
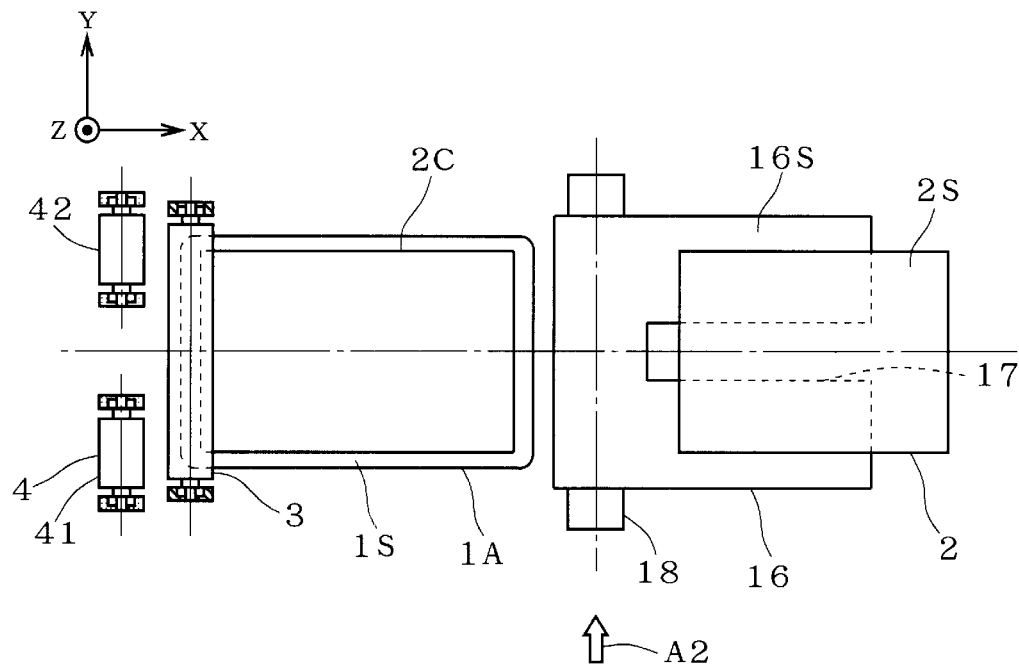
FIGS. 24 to 28 are step views of a panel fabrication method in accordance with the second preferred embodiment.

First, as schematically shown in the plan view of FIG. 24 viewed from the arrow A8 of FIG. 16, the cathode-ray tube 1 is temporally fixed by the fixing mechanism 10 with the surface 1S of the panel 1A facing upward (+Z direction), and the mechanism 11 controls the height of the panel 1A so that the horizontal level of the surface 1S of the panel 1A may correspond to that of the main pushing roller unit 3. After controlling, the cathode-ray tube 1 is properly fixed in the vertical direction.

Subsequently, as shown in the side view of FIG. 25, the functional film 2 with the adhesive 2A on one side is put on the mounting surface 16S of the affixing table 16 with an upper surface of the adhesive 2A facing upward, positioned, and fixed by suction with the suction unit 13. After suction, the release paper 2B covering the upper surface of the adhesive 2A is removed (see FIG. 25). The shape and function of the affixing table 16 and the suction force for the functional film 2 are the same as those of the first preferred embodiment.

Figure 25:
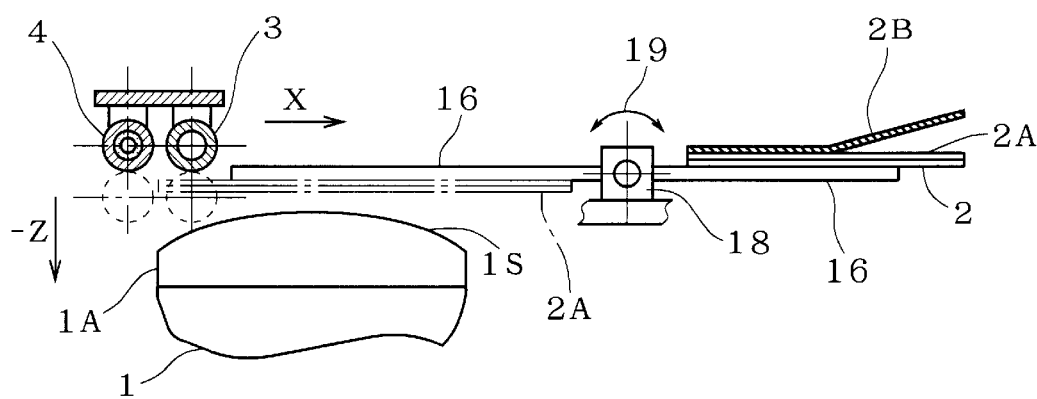

As shown in FIG. 25, the affixing table 16 is turned around by the table driving unit 20 so that the upper surface of the adhesive 2A of the functional film 2 after removing the release paper 2B may face downward (−Z direction) and the panel surface 1S of the cathode-ray tube 1 may be posed below the functional film 2. After turning around, in order to make an alignment of the cathode-ray tube 1 with the functional film 2, the cathode-ray tube 1 is positioned in the X and Y directions and fixed. At this time, the surface 1S of the panel 1A is not in touch with the functional film 2.

Figure 26:
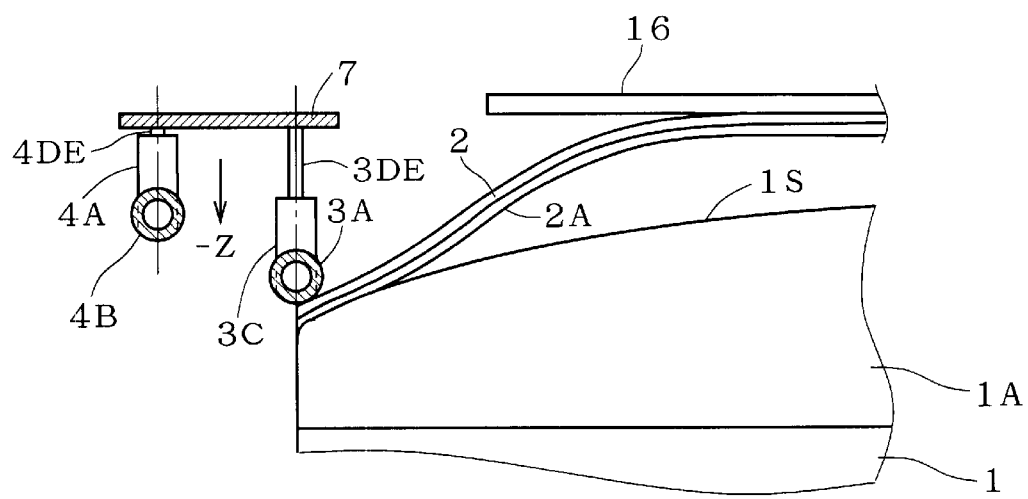

Next, as shown in FIG. 26, only the main pushing roller unit 3 is lowered to bring the elastic roller 3A in touch with one end surface of the functional film 2 out of the range defined by the effective frame 2C in the panel 1S, and thereby the one end surface of the functional film 2 is pushed against the corresponding surface 1S of the panel 1A and the functional film 2 is temporally fixed.

Figure 27:
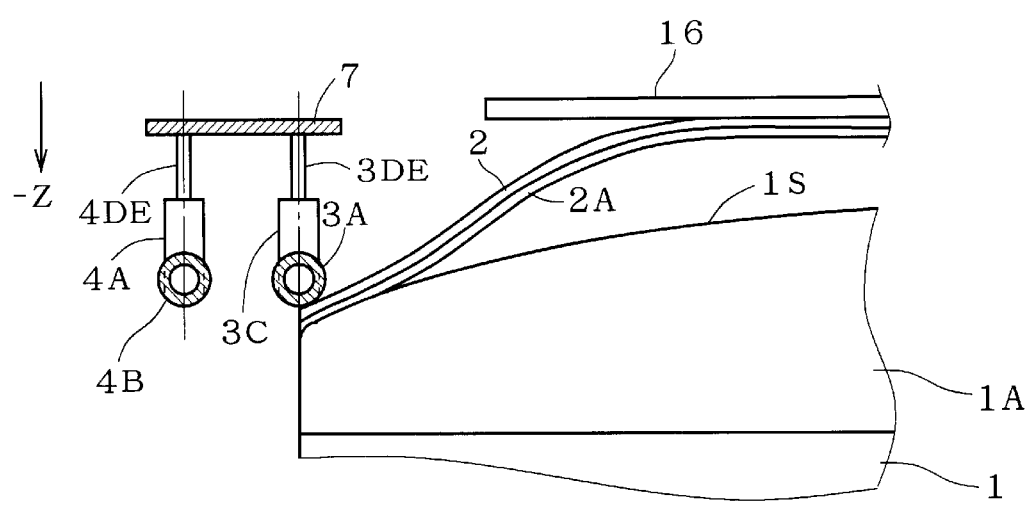

After the temporary fixing, as shown in FIG. 27, the first and second follow-up displacement pushing roller units 41 and 42 are lowered and then the affixing table 16 is turned aside so as not to interfere with a travelling-direction operating range of the pushing roller unit 3 and the follow-up displacement pushing roller units 4.

Figure 28:
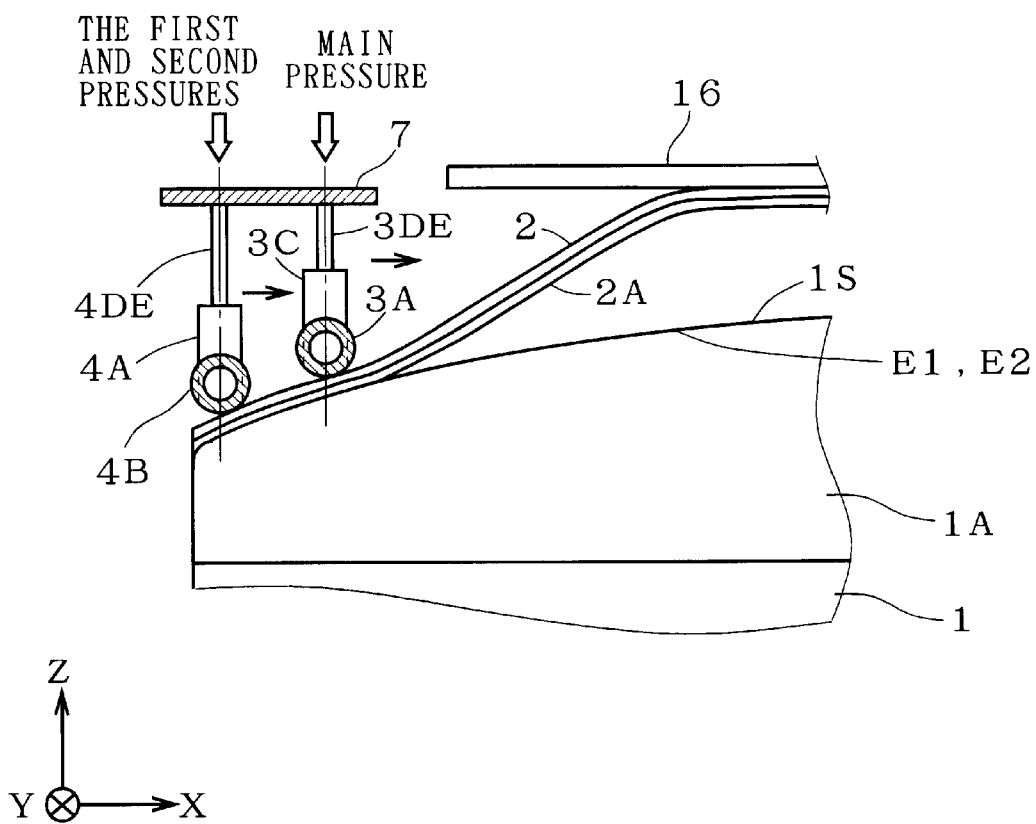

After turning the affixing table 16 aside, as shown in FIG. 28, the pushing roller unit 3, followed by the follow-up displacement pushing roller units 4, travels in the roller travelling direction X while pushing the functional film 2, to affix the functional film 2. At this time, in response to the movement of the pushing roller units 3 and 4, the affixing table 16 is intermittently turned aside.

Figure 29:
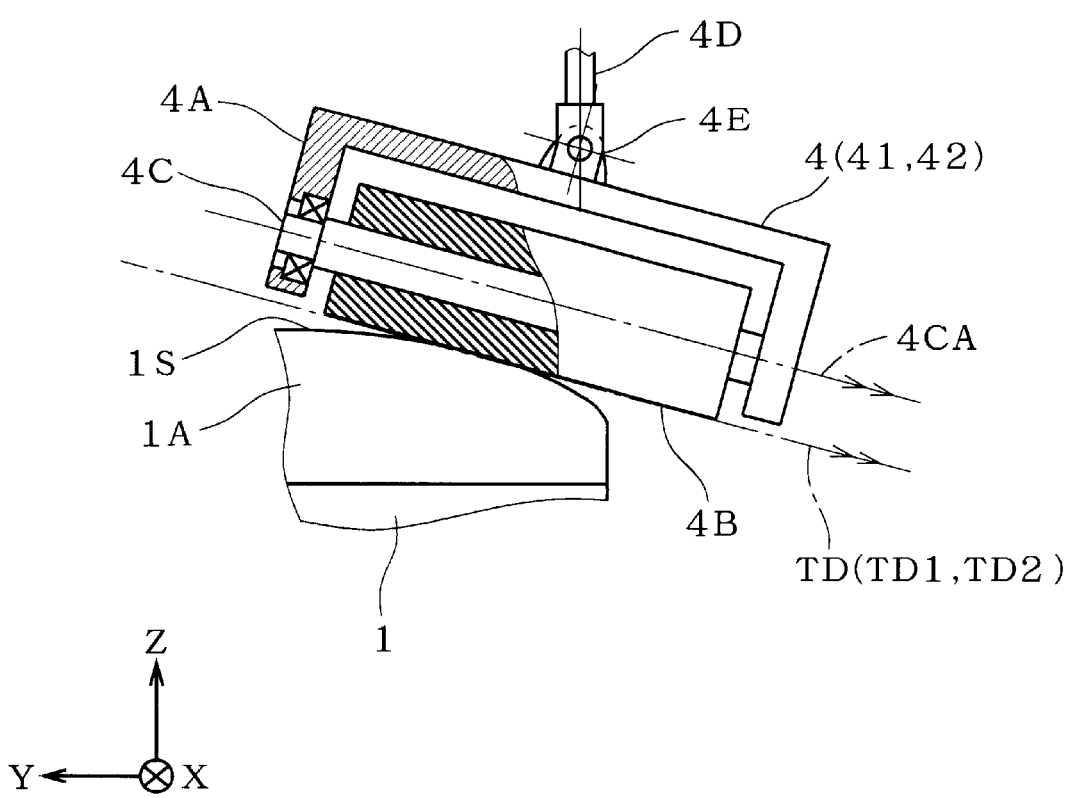
FIG. 29 is a schematic view showing an equalizing function of the follow-up displacement pushing roller unit.

In this case, since the follow-up displacement pushing roller units 4 have the equalizers 4E, as shown in FIG. 29, the equalizers 4E are displaced according to variation of the curvatures of the panel surface 1S at the end portions E1 and E2 in the YZ plane along the roller travelling direction X and the first and second elastic rollers 4B1 and 4B2 with their center axes 4CA in parallel with tangent directions TD (TD1, TD2) of the pushed panel surface push the panel surface, and therefore, even if the curvatures of the panel surface 1S at the end portions E1 and E2 in the YZ plane change along the roller travelling direction X (the curvatures are minimum on the sides of end portions in the X direction), the pressures of the follow-up displacement pushing roller units 4 are made uniform and even the surface of the functional film 2 which can not be affixed by the main pushing roller unit 3 can be affixed well by the follow-up displacement pushing roller units 4, uniformly with high quality.

As discussed earlier, since the pressure control high-precision regulators 9, 39 and 40 are individually provided for the main pushing roller unit 3 and the follow-up displacement pushing roller units 41 and 42, the pressure can be made almost uniform on the whole surface 1S of the panel 1A of the cathode-ray tube 1.

The outer shape of the inserted part of the shaft 3B in the center hole 3E of the main elastic roller 3A may be formed on the basis of the curvature of the panel surface 1S in the YZ plane, as shown in FIG. 4 or 12 in the first preferred embodiment. This modification effectively works when the curvature is small, achieving the effect of the first preferred embodiment addition to that of the second preferred embodiment.

Further, as to the constitution of the follow-up displacement pushing roller units 4, like the main pushing roller unit 3 of the first preferred embodiment, the shape of the shaft 4C may be modified so as to have the clearance d. In this case, the outer configuration of the shaft 4C is determined on the basis of the curvature of the panel surface 1S in the YZ plane, and when the curvature is small, the modification of the follow-up displacement pushing roller units 4 effectively works as discussed in the first preferred embodiment. Specifically, when a hollow is made between the center hole 4F of the elastic roller 4B and the shaft 4C by providing the clearance d (d1, d2), the elastic roller 4B is likely to deform, to make the pressure uniform even if the curvature is small.

Figure 30:
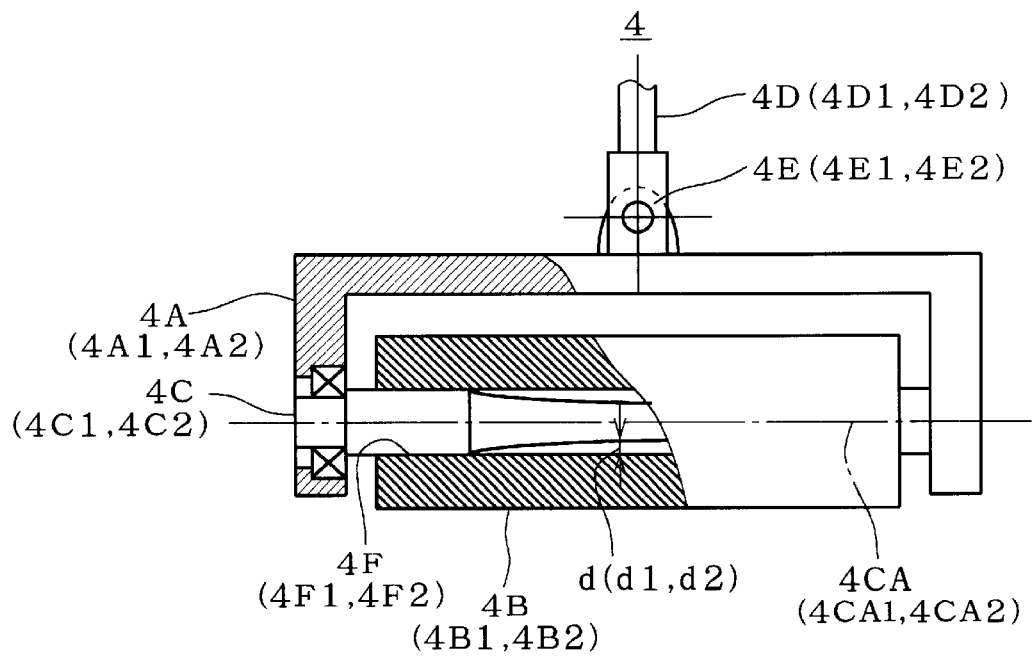
FIGS. 30 and 31 are cross sections showing a modification of the follow-up displacement pushing roller unit.
Figure 31:
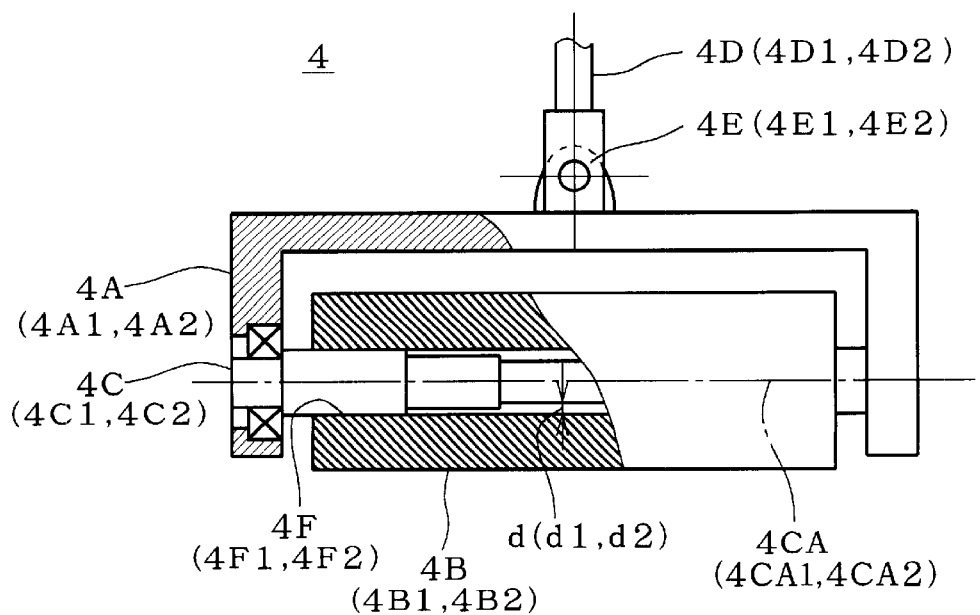

This modification is shown in FIGS. 30 and 31.

In the second preferred embodiment, as discussed above, when the functional film is affixed on the panel surface of the cathode-ray tube, addition to the main pushing roller unit 3 in the background art, the first and second follow-up displacement pushing roller units 41 and 42 having the equalizers 4E which allow follow-up displacement along the curvature of the panel surface 1S at the end portions E1 and E2 in the roller travelling direction are disposed on the sides of the first and second end portions behind the main pushing roller unit 3 viewed from the roller travelling direction and further the pressure control regulators 9, 39 and 40 for making the roller pressure uniform are provided for the respective pushing roller units, and therefore the roller pressures at both the end portions of the panel surface 1S in the YZ plane perpendicular to the roller travelling direction are made almost uniform on the whole surface in the roller travelling direction.

Consequently, in the ultraviolet hardening-type resin bonding method, since the thickness of the ultraviolet hardening-type resin layer is almost uniform at the end portions E1 and E2 intersecting the YZ plane perpendicular to the roller travelling direction and the air bubbles are hard to leave, it is possible to provide the panel with the functional film which is affixed uniformly with high quality.

In the adhesive bonding method, similarly, since there is no non-bonded surface portion, which is hard to affix only by using the main pushing roller unit in the background art, in the vicinity of the end portion of the panel intersecting the YZ plane perpendicular to the roller travelling direction and the air bubbles are not likely to generate, it is possible to affix the functional film uniformly with high quality on the panel surface 1S.

In the above discussion, though the end portions E1 and E2 of FIG. 17 are defined as the first and second end portions, and accordingly the follow-up displacement pushing roller units 41 and 42 are defined as the first and second follow-up displacement pushing units, respectively, they may be reversely defined.

Common Modification of The First and Second Preferred Embodiment

Figure 32:
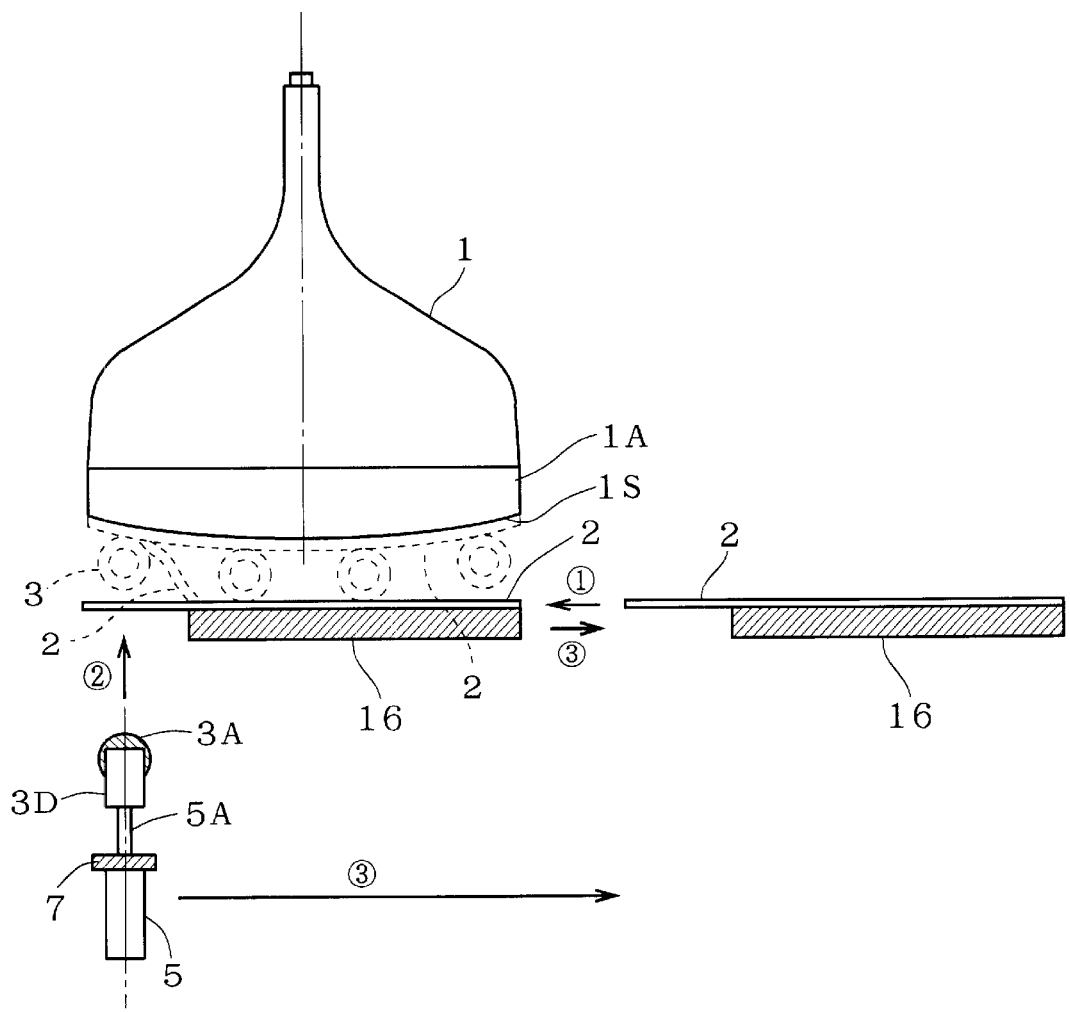
FIG. 32 is a view showing a modification common to the first and second preferred embodiments of the present invention.

In the above discussion, though the cathode-ray tube 1 is fixed with the panel surface 1S facing upward (+Z), the cathode-ray tube 1 may be fixed with the panel surface 1S facing downward (−Z), as shown in FIG. 32 (an application of the first preferred embodiment), to affix the functional film 2 thereon by moving the main pushing roller unit 3 having the clearance (the case of the first preferred embodiment) or the roller unit 3 and the two follow-up displacement pushing roller units 4 (the case of the second preferred embodiment) while pushing in the roller travelling direction. In this case, the same effect can be achieved.

While the invention has been shown and described in detail, the foregoing description is in all aspects illustrative and not restrictive. It is therefore understood that numerous modifications and variations can be devised without departing from the scope of the invention.

What is claimed is:

1. An apparatus for fabricating a panel of a display having a surface with a curvature in three dimensions with a functional film affixed on the surface thereof through a bonding source, comprising:

a main pushing roller unit, of which a roller travelling direction is a first direction and a longitudinal direction is a second direction in a plane perpendicular to said first direction, being capable of pushing said functional film against said surface of said panel through said bonding source across said surface of said panel from a first end portion to a second end portion opposite to said first end portion both of which intersect said second direction and travelling along said roller travelling direction; and a first follow-up displacement pushing roller unit, of which a longitudinal direction is in parallel with said second direction and which is positioned on the side of said first end portion behind said main pushing roller unit relative to said roller travelling direction, being capable of pushing said functional film against said surface of said panel through said bonding source in a range of a first distance from said first end portion towards said second end portion and travelling along said roller travelling direction, wherein an axis of the main pushing roller unit and an axis of the first follow-up displacement pushing roller unit are not coplanar, wherein said first distance is smaller than a length of a side of said panel, said side of said panel connecting said first end portion to said second end portion in parallel with said second direction, and said main pushing roller unit is capable of travelling along said roller travelling direction, followed by said first follow-up displacement pushing roller unit in response to each other.

2. The apparatus for fabricating a panel with functional film of claim 1 further comprising:

a second follow-up displacement pushing roller unit, of which a longitudinal direction is in parallel with said second direction and which is positioned on the side of said second end portion behind said main pushing roller unit relative to said roller travelling direction, being capable of pushing said functional film against said surface of said panel through said bonding source in a range of a second distance from said second end portion towards said first end portion and travelling along said roller travelling direction, wherein said second distance is smaller than said length of said side of said panel, and said main pushing roller unit is capable of travelling along said roller travelling direction, followed by said first follow-up displacement pushing roller unit and said second follow-up displacement pushing roller unit in response to one another.

3. The apparatus for fabricating a panel with functional film of claim 2, wherein said first follow-up displacement pushing roller unit comprises a first elastic roller capable of pushing said functional film directly against said surface of said panel; and a first equalizer changing an inclination of a center axis of said first elastic roller according to variation of a curvature of said surface of said panel along said roller travelling direction at said first portion in a sectional place defined by said second direction and a third direction perpendicular to said first and second directions, to thereby control said center axis of said first elastic roller to be in parallel with a first tangent direction in said sectional place at said first end portion of said surface of said panel.

4. The apparatus for fabricating a panel with functional film of claim 3, wherein said second follow-up displacement pushing roller unit comprises a second elastic roller capable of pushing said functional film directly against said surface of said panel; and a second equalizer changing an inclination of a center axis of said second elastic roller according to variation of a curvature of said surface of said panel along said roller travelling direction at said second end portion in said sectional place, to thereby control said center axis of said second elastic roller to be in parallel with a second tangent direction in said sectional plane at said second end portion of said surface of said panel.

5. The apparatus for fabricating a panel with a functional film of claim 4, wherein said main pushing roller unit comprises a main elastic roller capable of pushing said functional film directly against said surface of said panel; and a main pressure control mechanism capable of controlling a main pressure independently, said first follow-up displacement pushing roller unit further comprises a first pressure control mechanism capable of controlling a first follow-up displacement pressure independently, and said second follow-up displacement pushing roller unit further comprises a second pressure control mechanism capable of controlling a second follow-up displacement pressure independently.

6. The apparatus for fabricating a panel with functional film of claim 5, wherein said main elastic roller comprises a center hole therethrough, said main pushing roller unit further comprises a shaft inserted into said center hole;

an elastic roller holding part supporting both end portions of said shaft extending off said center hole; and a main pushing part connected to said main elastic roller holding part and said main pressure control mechanism, said main pushing part propagating said main pressure controlled by said main pressure control mechanism to said main elastic roller holding part, and wherein a clearance is provided between an outer surface of a portion of inserted part of said shaft in said center hole and a wall surface of said center hole.

7. The apparatus for fabricating a panel with functional film of claim 6, wherein said first elastic roller comprises a first center hole therethrough, said first follow-up displacement pushing roller unit further comprises a first shaft inserted into said first center hole;

an first elastic roller holding part comprising said first equalizer, said first elastic roller holding part supporting both end portions of said first shaft extending off said first center hole; and a first pushing part connected to said first equalizer of said first elastic roller holding part and said first pressure control mechanism, said first pushing part propagating said first follow-up displacement pressure controlled by said first pressure control mechanism to said first elastic roller holding part, a first clearance is provided between an outer surface of a portion of inserted part of said shaft in said first center hole and a wall surface of said first center hole, said second elastic roller comprises a second center hole therethrough, said second follow-up displacement pushing roller unit further comprises a second shaft inserted into said second center hole;

a second elastic roller holding part comprising said second equalizer, said second elastic roller holding part supporting both end portions of said second shaft extending off said second center hole; and a second pushing part connected to said second equalizer of said second elastic roller holding part and said second pressure control mechanism, said second pushing part propagating said second follow-up displacement pressure controlled by said second pressure control mechanism to said second elastic roller holding part, and a second clearance is provided between an outer surface of a portion of inserted part of said second shaft in said second center hole and a wall surface of said second center hole.

8. A method for fabricating a panel with a functional film affixed on a surface thereof through a bonding source by using an apparatus including a main pushing roller unit, of which a roller travelling direction is a first direction and a longitudinal direction is a second direction in a plane perpendicular to said first direction, being capable of pushing said functional film against said surface of said panel through said bonding source across said surface of said panel from a first end portion to a second end portion opposite to said first end portion both of which intersect said second direction and travelling along said roller travelling direction; and a first follow-up displacement roller unit, of which a longitudinal direction is in parallel with said second direction and which is positioned on the side of said first end portion behind said main pushing roller unit relative to said roller travelling direction, being capable of pushing said functional film against said surface of said panel through said bonding source in a range of a first distance from said first end portion towards said second end portion and travelling along said roller travelling direction, wherein said first distance is smaller than a length of a side of said panel, said side of said panel connecting said first end portion to said second end portion in parallel with said second direction, and said main pushing roller unit is capable of travelling along said roller travelling direction, followed by said first follow-up displacement pushing roller unit in response to each other;

said method comprising:
  a first step of disposing said panel, said functional film with its affixing surface facing said surface of said panel, said main pushing roller unit and said first follow-up displacement pushing roller unit positioned on the side of said first end portion behind said main pushing roller unit relative to said roller traveling direction at their predetermined positions; and
  a second step of controlling travel of said main pushing roller unit and said first follow-up displacement pushing roller unit in said roller travelling direction so that said main pushing roller unit travels, followed by said first follow-up displacement pushing roller unit, and both said main pushing roller unit and said first follow-up displacement pushing roller unit push said function film against said surface of said panel through said bonding source, to affix said functional film on said surface of said panel with respective pressures of said main pushing roller unit and said first follow-up displacement pushing roller unit.

9. The method for fabricating a panel with functional film of claim 8, wherein
  said first step further comprises:
    disposing a second follow-up displacement pushing roller unit, of which a longitudinal direction is in parallel with said second direction and which is positioned on the side of said second end portion behind said main pushing roller unit relative to said roller travelling direction, being capable of travelling along said roller travelling direction while pushing said functional film against said surface of said panel through said bonding source in a range of said second distance from said second end portion towards said first end portion in said second direction at its predetermined position, and
    said second step corresponds to
  controlling travel of said main pushing roller unit, said first follow-up displacement pushing roller unit and said second follow-up displacement pushing roller unit in said roller travelling direction so that said main pushing roller unit travels, followed by both said first follow-up displacement pushing roller unit and said second follow-up displacement pushing roller unit, and all of said main pushing roller unit, said first follow-up displacement pushing roller unit and said second follow-up displacement pushing roller unit push said function film against said surface of said panel through said bonding source, to affix said functional film on said surface of said panel with respective pressures of said main pushing roller unit, said first follow-up displacement pushing roller unit and said second follow-up displacement pushing roller unit.

10. The method for fabricating a panel with functional film of claim 9, wherein
  a second follow-up displacement pushing roller unit comprises
    a first elastic roller capable of pushing said functional film directly against said surface of said panel; and
    a first equalizer changing an inclination of a center axis of said first elastic roller according to variation of a curvature of said surface of said panel along said roller travelling direction at said first end portion in a sectional place defined by said second direction and a third direction perpendicular to said first and second directions, to thereby control said center axis of said first elastic roller to be in parallel with a first tangent direction in said sectional plane at said first end portion of said surface of said panel, and
  said second follow-up displacement pushing roller unit comprises
    a second elastic roller capable of pushing said functional film directly against said surface of said panel; and
    a second equalizer changing an inclination of a center axis of said second elastic roller according to variation of a curvature of said surface of said panel along said roller travelling direction at said second end portion in said sectional plane, to thereby control said center axis of said second elastic roller to be in parallel with a second tangent direction in said sectional plane at said second end portion of said surface of said panel.

11. The method for fabricating a panel with functional film of claim 10, wherein
  said travel of said main pushing roller unit and a first follow-up displacement pushing roller unit and said second follow-up displacement pushing roller unit along said roller travelling direction is controlled while said respective pressures of said main pushing roller unit, said first follow-up displacement pushing roller unit and said second follow-up displacement pushing roller unit are controlled independently.

12. The method for fabricating a panel with functional film of claim 11, wherein
  said main pushing roller unit includes
    a main elastic roller having a center hole therethrough;
    a shaft inserted into said center hole;
    an elastic roller holding part supporting both end portions of said shaft extending off said center hole; and
    a main pushing part connected to said main elastic roller holding part, said main pushing part propagating said pressure for said main pushing roller unit which is controlled to said main elastic roller holding part,
    and a clearance between an outer surface of a portion of inserted part of said shaft in said center hole and a wall surface of said center hole,
  said first follow-up displacement pushing roller unit includes
    said first elastic roller having a first center hold therethrough;
    a first shaft inserted into said first center hole;
    a first elastic roller holding part having said first equalizer, said first elastic roller holding part supporting both end portions of said first shaft extending off said first center hole; and
    a first pushing part connected to said first equalizer of said first elastic roller holding part, propagating said pressure for said first follow-up displacement pushing roller unit which is controlled to said first elastic roller holding part,
    a first clearance is provided between an outer surface of a portion of inserted part of said first shaft in said first center hole and a wall surface of said first center hole,
  said second follow-up displacement pushing roller unit includes,
    said second second elastic roller unit having a second center hole therethrough;
    a second shaft inserted into said second center hole;
    a second elastic roller holding part including said second equalizer, supporting both end portions of said second shaft extending off said second center hole; and
    a second pushing part connected to said equalizer of said second elastic roller holding part, propagating said pressure for said second follow-up displacement pushing roller unit which is controlled to said second elastic roller holding part, and a second clearance is provided between an outer surface of a portion of inserted part of said second shaft in said second center hole and a wall surface of said second center hole.

13. An apparatus for fabricating a panel with a functional film affixed on a surface thereof through a bonding source, comprising:

a main pushing roller unit, of which a roller travelling direction is a first direction and a longitudinal direction is a second direction in a place perpendicular to said first direction, being capable of pushing said functional film against said surface of said panel through said bonding source across said surface of said panel from a first end portion to a second end portion opposite to said first end portion both of which intersect said second direction and travelling along said roller travelling direction, wherein said main pushing roller unit comprises
a main elastic roller having a center hole therethrough;
a shaft inserted into said center hole;
a main pushing part supporting both end portions of said shaft extending off said center hole; and
a pushing part connected to said main elastic roller holding part, propagating a pressure for said main pushing roller unit to said main elastic roller holding part, and
a clearance is provided at least between an inner wall surface of said center hole of said elastic roller and an outer surface of said shaft.

14. The apparatus for fabricating a panel with functional film of claim 13, wherein said inserted part of said shaft comprises
a first portion having a first outer diameter corresponding to an inner diameter of said elastic roller;
a second portion having a second outer diameter corresponding to said inner diameter of said elastic roller; and
a third portion connected to said first and second portions and having an outer shape in which an outer diameter of any position is smaller than said inner diameter of said elastic roller.

15. The apparatus for fabricating a panel with functional film of claim 14, wherein said outer shape of said third portion comprises a shape determined on the basis of a curvature of said surface of said panel in a sectional plane defined by said second direction and a third direction perpendicular to said first and second directions.

16. A method for fabricating a panel with functional film, wherein said functional film is affixed on said surface of said panel through said bonding source by using an apparatus including:

a main pushing roller unit, of which a roller travelling direction is a first direction and a longitudinal direction is a second direction in a plane perpendicular to said first direction, being capable of pushing said functional film against said surface of said panel through said bonding source across said surface of said panel from a first end portion to a second end portion opposite to said first end portion both of which intersect said second direction and travelling along said roller travelling direction, wherein said main pushing roller unit comprises:

a main elastic roller having a center hole therethrough;
a shaft inserted into said center hole;
a main pushing part supporting both end portions of said shaft extending off said center hole; and
a pushing part connected to said main elastic roller holding part, propagating a pressure for said main pushing roller unit to said main elastic roller holding part, and
a clearance is provided at least between a wall surface of said center hole of said elastic roller on a side where said surface of said panel is pushed and an outer surface on said side where said surface of said panel is pushed of a portion of inserted part of said shaft in said center hole.

17. The apparatus of claim 13, where in the clearance is eliminated or reduced when the elastic roller is pushed against said surface of said panel.

* * * * *